United States Patent [19]

Perreault et al.

[11] 3,889,057

[45] June 10, 1975

[54] FASCIMILE COMMUNICATION SYSTEM

[75] Inventors: Donald A. Perreault, Pittsford; Victor Lee Bedzyk, Fairport; Larry Richard Matthews, Victor; Roy Wilben Rivers, Conesus; David Rolling Shuey, Webster; John David Torpie, Penfield, all of N.Y.

[73] Assignee: Xerox Corporation, Stamford, Conn.

[22] Filed: Aug. 27, 1973

[21] Appl. No.: 391,694

Related U.S. Application Data

[62] Division of Ser. No. 253,827, May 16, 1972.

[52] U.S. Cl............ 178/69.5 F; 178/6.6 P; 178/7.6; 178/5.6

[51] Int. Cl.............................................. H04n 1/36

[58] Field of Search............. 178/69.5 F, 6.6 P, 7.6, 178/5.6

[56] References Cited

UNITED STATES PATENTS

| | | | |
|---|---|---|---|
| 2,290,229 | 7/1942 | Finch | 178/6.6 |
| 3,662,096 | 5/1972 | Morton | 178/7.3 S |

*Primary Examiner*—Howard W. Britton
*Assistant Examiner*—Edward L. Coles

[57] ABSTRACT

A facsimile communication system is described wherein the transmission of data between a transmitting and receiving apparatus over a voice quality transmission medium is accomplished by providing spectrum compressing encoding of a video signal and by frequency modulation and vestigial sideband transmission of the frequency modulated video signal. In a principal mode of operation, the transmission of video data is preceded by receiver alerting, equalizing, synchronizing and scan pitch signals for respectively shifting the receiver from a standby to an operating status, for correcting distortions in the transmission medium, for causing line by line synchronization between sending and receiving units and for establishing the scanning pitch at the printing unit. A transceiving unit of the system when operating as a receiver in the principal mode generates reverse signalling information for acknowledging a ready to receive status at the initiation of communication and a printer ready status for enabling the transmission of video information. A high degree of reliability in interaction between the sending and receiving units is thereby imparted to the system and facilitates scanning and electrostatographic printing techniques.

The transceiving system of the invention is further adapted for operating in optional modes including an automatic document feeding mode, an unattended sending mode and a printer polling mode. The communication system is further adapted to operate with existing facsimile systems which transmit at relatively lower document transmission rates, exhibit different signal formats and have different internal controlling.

1 Claim, 32 Drawing Figures

FASCIMILE COMMUNICATION SYSTEM

This is a division of application Ser. No. 253,827, filed May 16, 1972.

AN IMPROVED FACSIMILE COMMUNICATION SYSTEM

This invention relates to communication systems. The invention relates more particularly to an improved facsimile telecommunication system.

Facsimile telecommunication systems are known wherein graphic information is transmitted between a local and a remote transceiving apparatus. In one form of present day facsimile telecommunication system, the transceiving apparatus are conveniently linked through data couplers and a voice quality telephone transmission line. The transceivers are generally adapted for initially intercommunicating in order to verify a ready-to-receive status of a receiving unit. When this condition has been established, the sending unit proceeds to synchronize scanning of the units and to transmit video information. The receiving unit then synchronously reproduces the graphic information which is transmitted.

Various transceiving systems of this type are presently in commercial operation. These systems differ among themselves in various operating and performance characteristics such as, for example, the rate at which a document is scanned and transmitted, the signaling format utilized and the employment of manual and/or automatic modes of operation. When the sending unit is operating in a manual mode, the receiving unit can be adapted for both unattended and attended answering while the sending unit is adapted for attended single sheet feeding of a document to a document scanning station. In an automatic mode of operation, the receiving apparatus can operate in an unattended manner while the sending unit may utilize a means for automatically feeding documents to the scanning station. The receiving unit in both the manual and automatic modes of operation may also utilize a roll or web feed copy material at the printer or alternatively, a single sheet feed arrangement. Thus a variety of different facsimile transceiving systems utilizing telephone transmission lines are presently in commercial use.

While these present day systems produce acceptable copy material, the systems generally are limited both with respect to the document scanning and transmission rates and with respect to the quality of the reproduced document. The document scanning and transmission rates are limited principally by the relatively narrow bandwidth of the voice quality telephone channel while the quality of the reproduced document is also by the requirement for the use of a sensitized copy paper.

It would be advantageous to provide a facsimile communication system having a relatively increased rate of transmission, which has a relatively high degree of automation, and which can reproduce a document on plain or unsensitized paper. It is particularly advantageous to provide a transceiving system with these characteristics which at the same time is compatible for operation with the various existing facsimile systems.

Accordingly, it is an object of this invention to provide an improved form of facsimile communication system.

Another object of the invention is to provide a facsimile communication system which is adapted to transmit and receive facsimile data at a relatively high rate over a voice quality transmission medium.

Another object of the invention is to provide a facsimile communication system which produces copy of relatively improved quality.

Another object of the invention is to provide a facsimile communication system having an improved signal transmission arrangement for providing enhanced utilization of a bandwidth limited transmission medium.

Another object of the invention is to provide a facsimile communication system which is adapted for operating at a relatively high transmission rate and which is also compatible with and is adapted for transmitting to and receiving from existing relatively slower document transmission rate facsimile apparatus.

A further object of the invention is to provide a facsimile transmission system which is adapted for reproducing copy on a plain or unsensitized recording medium.

Another object of the invention is to provide an improved facsimile communication system adapted for reproducing copy through electrostatographic techniques.

Another object of the invention is to provide an improved facsimile communication system which is adapted for operation in an attended or unattended receiving mode of operation.

Another object of the invention is to provide a facsimile communication system having an improved arrangement for exchanging signals for enhancing system reliability.

Another object of the invention is to provide an improved facsimile communication system having a transceiving apparatus adapted for operation in an attended or unattended sending mode of operation.

Another object of the invention is to provide an improved facsimile communication system which is adapted for automatically feeding documents from a stack to a reading station of the transceiving apparatus.

A further object of the invention is to provide an improved facsimile communication system which is adapted for locally initiating the transmission of documents from a remote unattended transceiving apparatus and for reproducing the documents at a local apparatus.

Another object of the invention is to provide an improved facsimile communication system having means for providing line by line synchronization between transceiving apparatus.

A further object of the invention is to provide a facsimile communication system having means for providing line by line synchronization of similar transceivers and for providing phasing with transceiving apparatus of different design.

Another object of the invention is to provide a facsimile communication system having improved signaling means for emergency terminating the operation of the system either automatically or manually from the sending or receiving transceiving unit.

Still another object of the invention is to provide a facsimile transceiver employing an electrostatographic printer and an improved laser light source arrangement for alternatively scanning a document or forming electrostatic images on a photo-receptor of the printer.

Another object of the invention is to provide a facsimile transmission system having electrostatographic printing means adapted for providing gray scale rendition in a reproduced image.

Another object of the invention is to provide an improved arrangement for forming half tone images in an electrostatographic reproduction apparatus.

Still another object of the invention is to provide a facsimile communication system having transceiving apparatus adapted for automatically terminating operation of the apparatus when a predetermined sequence of events or event fails to occur within a predetermined interval of time.

In accordance with the general features of the facsimile communication system of this invention, the transmission of data between a transmitting and receiving apparatus over a voice quality transmission medium is accomplished by providing spectrum compressing encoding of a video signal and by frequency modulation and vestigial sideband transmission of the frequency modulated video signal. In a principal mode of operation, the transmission of video data is preceeded by receiver alerting, equalizing, synchronizing and scan pitch signals for respectively shifting the receiver from a standby to an operating status, for correcting distortions in the transmission medium, for causing line by line synchronization between the sending and receiving units, and for establishing the scanning pitch at the printing unit. A transceiving unit of the system when operating as a receiver in the principal mode generates reverse signaling information for acknowledging its ready-to-receive status at the initiation of communication and a printer ready status for enabling the transmission of video information. A high degree of reliability in interaction between the sending and receiving units is thereby imparted to the system and facilitates scanning and electrostatographic printing techniques.

The transceiving system of this invention in its principal mode of operation is optionally adapted for operating in an automatic document feeding mode, in an unattended sending mode and for polling a remote transceiver and causing the remote transceiver to operate as a sending unit for the local printing unit. These modes of operation utilize an automatic document feeding means which sequentially feeds a plurality of documents from a stack of documents to a reading station and in addition provides signaling in the case of unattended sending and polling, for conditioning the transceiving apparatus to function in a sending state.

The facsimile communication system of the invention is advantageously further adapted for operating with existing facsimile systems which communicate at a relatively lower document transmission rate than the principal mode of operation of the present apparatus. The compatible sending is provided by the generation of a signaling format which is compatible with presently existing facsimile communication systems. A compatible receive operation is accomplished by the automatic identification of the nature of the received signal and by adjusting to the sending format of the transmitting unit.

These and other objects and features of the invention will become apparent with reference to the following specification and to the drawings wherein.

Figures 1, 3, 4A, 4B, 4C, 26:
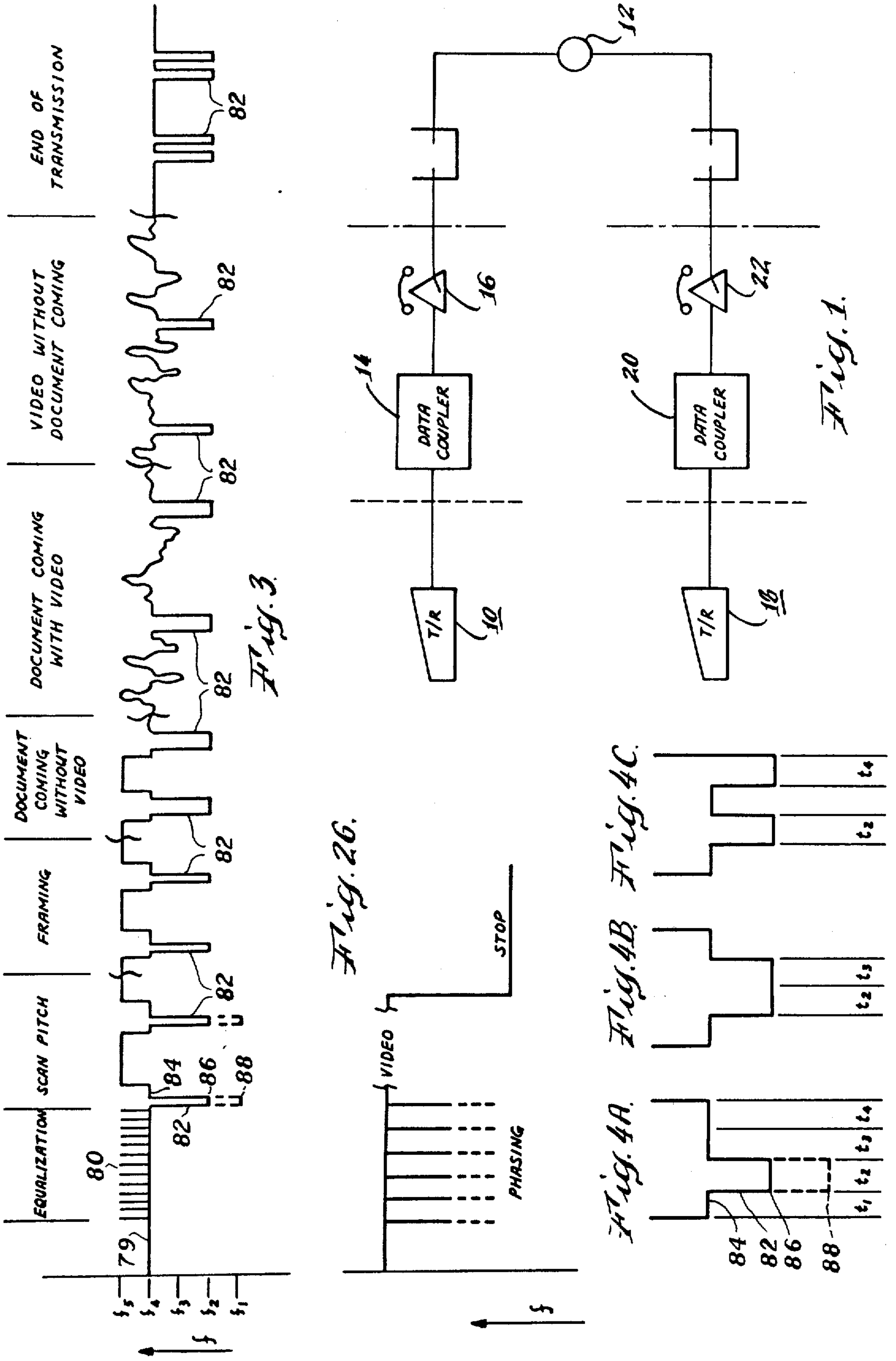
FIG. 1 is a schematic diagram of a facsimile communication system of the present invention.
FIG. 3 is a diagram of a signaling format illustrating a composite signal waveform generated by a transceiving apparatus of the present invention when operating in a principal mode.
FIGS. 4A–4C are diagrams illustrating the timing of control signals employed with the apparatus of FIG. 2 when operating in a principal mode.
FIG. 26 is a diagram illustrating a signal format generated by the apparatus of this invention in a compatible mode of operation; and, FIG. 27 is a block diagram of a compatability detector component of the transceiver apparatus of FIG. 5A; and, FIGS. 28 and 29 are flow diagrams illustrating the sequence of events occurring when the transceiver of this invention operates in a compatible mode.

A facsimile communication system illustrated in FIG. 1 includes a transceiving unit 10 which is coupled to a voice quality telephone transmission line 12 through a conventional date coupler 14 and an auxiliary telephone handset 16. A similar transceiving unit 18 is also coupled to the transmission line through an associated data coupler 20 and an auxiliary telephone handset 22. The transceiving units are each adapted for scanning a document and for generating a video signal for transmission to a corresponding transceiver when operating in a sending mode and for receiving a video signal and reproducing the information in the video signal through electrostatographic techniques. As is described in greater detail hereinafter, scanning in the sending mode of operation is accomplished by repetitively deflecting a laser light beam across an advancing document at a scanning station of the transceiver. Scanning is accomplished in a printing mode by repetitively scanning the laser light beam across a moving photoreceptor surface.

In addition to providing an increased document transmission rate capability and the use of laser scanning the xerographic printing techniques in the transceiving system of FIG. 1 is particularly advantageous because of its flexibility and compatibility. Each of the transceivers of the system when operating in a principal mode of operation operates alternatively as an attended sending unit at one of a plurality of document transmission rates such as 2 or 3 minutes per document or as an unattended printing unit. In this principal mode of operation, the attendant loads a single document which is to be transmitted and initiates operation by the sending unit. The document is automatically scanned by a laser light beam and a video signal which is generated is processed and transmitted to a corresponding receiving unit. The corresponding receiving unit automatically operates in an unattended printing mode whereby the video information transmitted thereto is utilized for modulating a laser light beam in a xerographic printer. Thus, in this principal mode of operation an operator attends the sending transceiving unit while the receiving unit operates unattended.

In addition to this principal mode of operation, the transceiving apparatus of FIG. 1 can optionally operate in an automatic document feeding mode, in an unattended sending mode and in a polling mode. An automatic document feeding means is provided for automatically feeding documents from a stack of documents to a scanning station of the transceiving apparatus when the apparatus is operating in a sending mode. Thus, the attendant at the sending station need only load a stack of documents which is to be transmitted and initiate operation of the apparatus. The transceiver then automatically feeds the documents seriatim from this stack to the reading station for generating the video signals for transmission to the remote corresponding transceiver. After the final document has been transmitted to the remote transceiver, both the sending and receiving transceivers automatically return to a standby state.

A second optional operating mode comprises the unattended sending mode wherein the transceiver is adapted to scan and send a document to a remote printing transceiver. The unattended sending mode utilizes an automatic document feeding means referred to above for feeding documents to a scanning station. Operation of the transceiver in this mode is initiated by signaling from a remote transceiver indicating its readiness to receive the transmission from the unattended transceiver.

A further optional mode of operation comprises a printer polling mode wherein a local transceiving apparatus is adapted for signaling a remote transceiver and causing the remote transceiver to initiate scanning and the unattended sending of documents to the local transceiver. The local transceiver which initiated the polling then operates in a receiving mode in order to print out and reproduce the documents which are transmitted by the remote transceiver. Thus, a high degree of flexibility is provided by the present transceiving system because, in addition to the basic principal mode of unattended printing and attended sending, the transceiving system is adapted to operate in an automatic document feeding mode, an unattended sending mode and a polling printer mode.

As indicated hereinbefore, present day facsimile transceiving systems vary among themselves with respect to the rate of document transmission, the signal format employed, and the various modes of manual and automatic operation referred to hereinbefore. A particular feature of the present invention, is the provision of a transceiving system which is adapted for compatible operation with these existing facsimile systems having at least two document transmission rates such as 4 and 6 minutes per document differing from the relatively higher transmission rates of the present system in its principal mode and signal formats differing from the signal format of the transceiver of the present system in a principal mode of operation. When operating in the principal mode and in the principal optional modes, the similar transceivers of the system of FIG. 1 will, as described in greater detail hereinafter, provide for equalization of the transmission line 14 of FIG. 1 and synchronize the sending and receiving unit on a line-by-line basis. When operating in a compatible mode of operation however, the apparatus of FIG. 1 will generate a signal format which is compatible with the format of existing apparatus.

The facsimile communication system of the invention will be initially described in detail with respect to its principal mode of operation. This principal mode of operation of the system is described with respect to a transceiving apparatus 10 and a transceiving apparatus 18 which are shown generally in FIG. 2. The transceiving apparatus 10 is shown to be operating in a document scanning or transmitting mode and is communicating with a similar transceiving apparatus 18 shown to be operating in a receiving or printing mode. The transceiving units are intercoupled by means including a voice quality telephone transmission line as well as data couplers and auxiliary telephones referred to generally as 21 in FIG. 2. The transceiving apparatus 10 includes a document scanner 36 for line scanning and generating video signals representative of the document which is to be transmitted to the remote transceiver 18. The video signals thus generated are applied to a modulater 38 wherein the video signals frequency modulate a carrier for transmission to the remote unit 18. In order to provide enhanced use of the limited bandwidth provided by the transmission line 12, the video signal is initially encoded and a frequency modulated video signal is then vestigial sideband transmitted to the receiving unit. The use of these techniques contributes to a reduction in the bandwidth required for the reproduction of acceptable copy and therefore enhances the rate at which line scanning occurs and the rate at which a document can be transmitted. The receiving unit 18 includes a means 40 for both demodulating the received signal and detecting the encoded video signal. The video signal thus detected is coupled to a printing means 42 wherein the video information contained in the signal is xerographically reproduced by line scanning techniques, described in detail hereinafter. The transceiving apparatus 10 also includes a printer 44 while the transceiver 18 similarly includes a scanner 46 thereby enabling each of the transceiving units to function as a document scanner and transmitter, or, alternatively as a receiver and printer.

Each of the transceiving units 10 and 18 when activated by an attendant exist in a standby printing status and are conditioned for transition to an active printing status or to a sending status. The sending unit 10 in a principal mode of operation generates forward signals which are transmitted to the receiving unit 18 prior to the transmittal of video information while the receiving unit 18 transmits handshaking information acknowledging its status as a ready receiver as well as the synchronized and ready status of its printer. Alerting of the transceiver 18 by an operator at unit 10, through the telephone described in more detail hereinafter, results in the generation of acknowledgement signals at a predetermined frequency which are transmitted from the transceiver 18 to the transceiver 10 and indicate the availability of the transceiver 18 to accept a video data transmission. These reverse signals are generated by a reverse channel signal sender 50 under the control of a control means 52 at the transceiver 18. The acknowledge signals which comprise, for example, cyclically recurring bursts of a predetermined frequency occur for 1 second in a 3 second time interval and are applied to a frequency modulator 54 for transmission to the transceiver 10. Upon receipt of the acknowledge signals, an attendant will initiate the transmission of the document by depressing a start push button. Controls 56 and 58 of the transceiver 10 causes the modulator 38 to generate a carrier signal of predetermined frequency $f_5$. The carrier segment is transmitted to the receiver 18 where it is coupled to a forward signal detector 59. This carrier signal functions to indicate to the transceiver 18 that it is in communication with transceiver operating in a principal mode of operation, i.e. a similar transceiver, and additionally functions to disable echo suppressors which may exist in the transmission path. The carrier signal is then succeeded by a sequence of pulses which function to indicate the distortions existing along the transmission path to an automatic equalizing means at the transceiver 18 and which is referred to in more detail hereinafter. A series of synchronizing pulses follow the equalizing pulses. Initially, these pulses indicate to the receiver the scan pitch of the reading unit. As it is well known, the scan pitch represents the number of scans per unit of length. Following these initial pulses, the synchronizing pulses are used for establishing framing at the receiver. After a series of synchronizing pulses have been transmitted to the unit 18 and the receiving unit scanner is synchronized with the sending unit, a reverse signal indicating that the receiving unit is ready for printing is generated and is transmitted to the sending unit 10. This signal comprises aa cyclically recurring burst at a predetermined frequency occurring for an interval of time, for example, approximately equal to one-sixth of a second in a 3 second time cycle. This signal as well as the initial acknowledge signal are coupled via a reverse channel signal detector 62 to the control means 56.

Each of the transceiving units 10 and 18 is similar in construction and is adapted for alternatively operating as a transmitter or as a receiver. The unit 10 thus includes a forward channel receiver 64 and a reverse channel signaling means 66 for use when operating in a receiving state and which are similar to the members 59 and 50 respectively of the unit 18. Similarly, the unit 18 includes forward control signaling means 68 and a reverse channel signal receiver 70 for use when operating in a transmitting state and which are similar to the members 58 and 62 respectively of the unit 10. Each of the transceivers 10 and 18 additionally includes a hybrid network 72 and 74 respectively for inhibiting the leakage of signal being transmitted into a receiving channel of the same transceiver.

A composite waveform illustrating the demodulated signaling occurring during the transmission of a document in the principal mode of operation is illustrated in FIG. 3. The carrier signal which is initially transmitted is represented by the level 79 corresponding to a frequency $f_4$. A plurality of equalizing pulses 80 which follow the carrier signal 79 occur at frequency $f_5$. As indicated, synchronization of printer scanning with the document scanner is provided by synchronizing pulses 82 which extend from a blanking level 84. The rate at which the synchronizing pulses occur is dependent upon the rate of transmission of the document. In addition to the repetition rate of the synchronizing pulses, the scanning at the printer is also determined by the scanning line pitch. The line pitch is represented by the level of the synchronizing pulses 82 during the initial period of synchronizing pulse transmission. The synchronizing pulses can have a demodulated level 86 or 88 corresponding to frequencies $f_2$ and $f_1$ respectively and representing alternative line pitches. Subsequent to the establishment of synchronization and conditioning of the receiver for accepting a transmission, the receiving apparatus generates the printer ready reverse signal, as indicated, for acknowledging the synchronization of the scanning printer to the document scanner as well as the existance of other printer reading conditions. Upon receipt of this signal, the sending unit automatically feeds the document to the scanning station for initiating video scanning and transmission.

As indicated in greater detail in FIGS. 4A and 4B, the initiation of video transmission is accompanied by an increase in the time interval occupied by the synchronizing pulse. FIG. 4A illustrates a blanking interval divided into equal time intervals $t_1$, $t_2$, $t_3$ and $t_4$. The synchronizing pulse normally occupies the interval of time $t_2$. However, when video information is to follow, the pulse is widened to include the interval of time $t_2$ and $t_3$ as indicated in FIG. 4B. The appearance of a synchronizing pulse of enlarged time interval or pulse width indicates that video information follows the sixth of such pulses immediately following a synchronizing pulse of this shape. As the transmission of video information continues, the synchronizing pulse will continue to exhibit a widened pulse shape as illustrated in FIG. 4B until, for example, one second before such time as document scanning is completed. At this time, the synchronizing signal pulse reverts to the shape illustrated in FIG. 4A and the blanking level and synchronizing pulse as indicated in FIG. 4A will be transmitted in the absence of video information until a maximum time-out interval has been attained. When the time-out interval is reached, the apparatus automatically reverts to a printer standby mode. However, if a second document is loaded before the time-out interval elapses, the transceiver will automatically transmit the widened synchronizing pulse along with the appropriate video signal representing this scanned document in response to another printer reading signal. An alternative form of the synchronizing signal comprising an end of transmission indication, illustrated in FIG. 4C, will be discussed in detail hereinafter with respect to an optional mode of operation.

Figure 2:
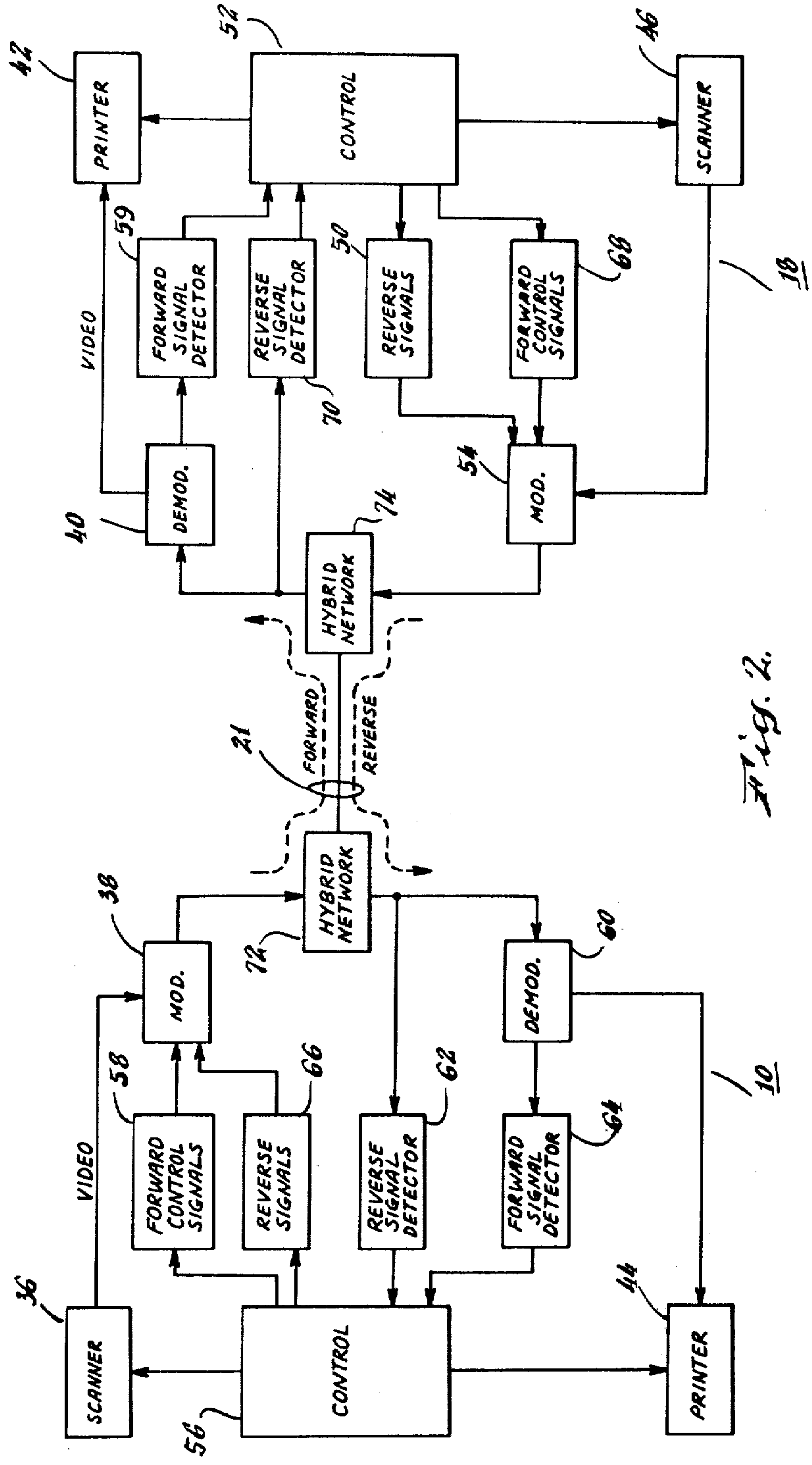
FIG. 2 is a block diagram illustrating the general operation of the facsimile communication system of the present invention.
Figure 5A:
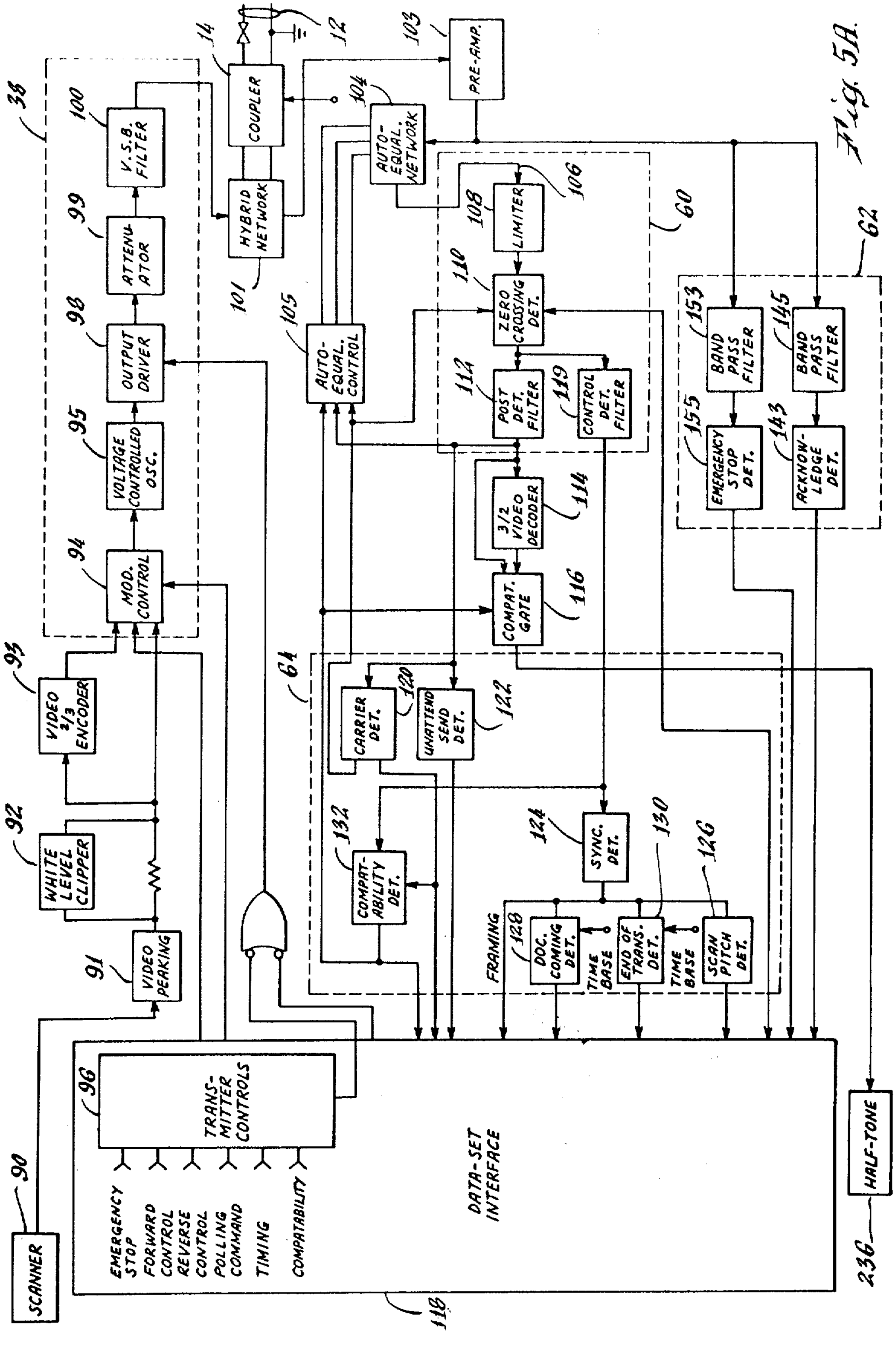
FIG. 5A is a block diagram of a transceiving apparatus of the invention particularly illustrating data set, control signal detection and transmitter control portions thereof.
Figure 5B:
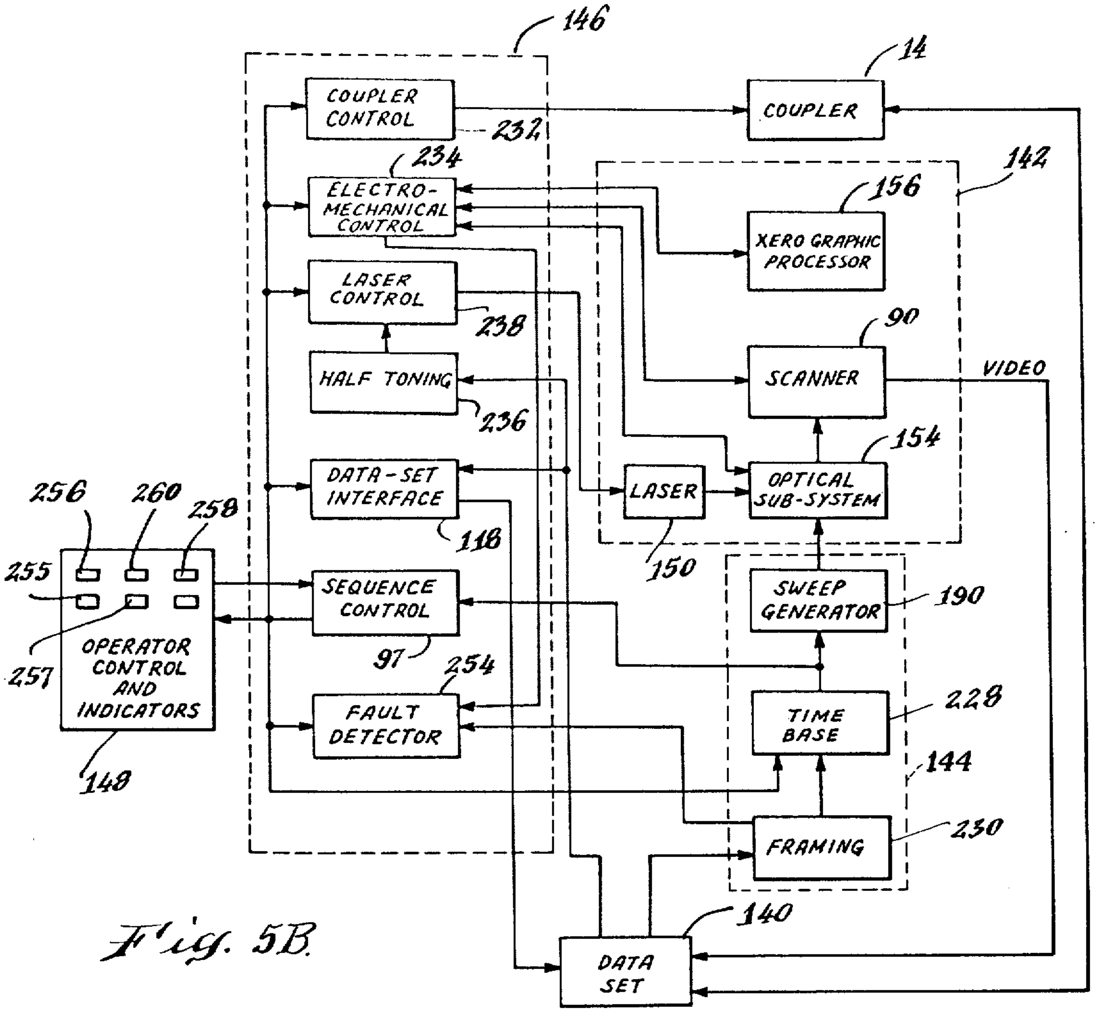
FIG. 5B is a block diagram of the transceiving apparatus of the invention particularly illustrating another portion of the transceiving apparatus.

A more detailed block diagram of transceiving apparatus constructed in accordance with features of the invention is illustrated in FIGS. 5A and 5B wherein FIG. 5A illustrates a data set arrangement for the transceiver while FIG. 5B illustrates a transceiver control, time base, framing means and sweep generation. In addition, FIG. 5B illustrates in a generalized form the document scanning and xerographic processing arrangement employed with the transceiver. Details of this latter portion of the transceiver are discussed hereinafter with respect to FIGS. 9 and 10. Those elements of FIGS. 5A and 5B which are similar to elements illustrated in FIG. 2 bear the same reference numerals. Those areas of FIG. 5A which are enclosed by dashed lines and which bear the same reference numerals as components of FIG. 2 illustrate within the enclosed area a more detailed presentation of the respective components of FIG. 2.

In accordance with one of the features of the invention, more efficient utilization is made of the relatively narrow bandpass voice quality telephone line 12 by encoding the video signal in a spectrum compressing manner and by transmitting the signal by frequency modulation in a vestigial sideband manner. A video signal output from a laser scanner 90 is applied to a video peaking circuit 91 and to an alternate analogue encoding circuit means 93 through a white level clipper circuit means 92. Alternate analogue encoding of an nonsynchronous baseband analogue signal at the sending transceiver compresses the spectrum of the video signal to a relatively smaller bandwidth than that required for an unencoded signal. This is accomplished by alternating the polarity of the analogue signal with respect to a center level of black video, for example. The center level can alternatively comprise white video. This video transmission scheme is additionally advantageous in that the gray scale capabilities of the system is maintained. A circuit means 93 for accomplishing the alternate analogue encoding is described in detail and is claimed in a copending U.S. patent application Ser. No. 213,697, now U.S. Pat. No. 3,795,765 which was filed on Dec. 29, 1971 and which is assigned to the assignee of this invention.

An encoded output video signal from the encoder 93 is applied via a modulator controlled gate 94 to a voltage control oscillator 95. The control gate 94 has applied thereto inputs from a transmitter control 96 for alternatively enabling the application of modulating video signals to the oscillator 95 or for applying thereto alternative signals in accordance with the mode and optional form of operation of the transceiver. In the principal mode of operation, the transmitter control 96 will provide control voltages for frequency modulating the voltage controlled oscillator 95 in order to generate, in the proper sequence, forward signaling. This forward signaling comprises as indicated hereinbefore the carrier signal 79, equalizing pulses 80, the synchronizing pulses 82 having alternative scan pitch levels and a widened synchronizing pulse (FIG. 4B) indicating video signal information follows. The transmitter control 96 also functions to generate other control signals in accordance with other modes of operation of the transceiver described hereinafter. The particular frequencies generated by oscillator 95 to convey the forward control signals are determined by transmitter control 96 whose output level is coupled to the oscillator by a control gate 94. This is accomplished by pulses derived from a time base 128, described hereinafter, in conjunction with signals from sequence control 97. A frequency modulated signal from the oscillator 95 is applied to the transmission line 12 via an output driver amplifier 98, an attenuator 99, a vestigial sideband filter 100 and the hybrid network 101. The output of the network 101 is applied via the coupler 14 to the transmission line 12. The transmitter portion of the data set further includes a means for bypassing the video signal encoder when the transceiver is operating in an alternative compatible mode, described hereinafter.

The data set arrangement of FIG. 5A includes a receiving section including a demodulating section 60, a forward signal receiving and detecting section 64 and a reverse signal detecting system 62. Forward signaling from the transceiver 18 operating in a sending mode as well as reverse signaling from this transceiver when operating in a receiving mode is applied to the hybrid network 101 through the coupler 14. The coupler 14 provides for a bilateral two wire transmission path. This transmission path is automatically coupled to the line 12 in response to control signals from the transceiver. In addition, the auxiliary telephone 16 (FIG. 1) is provided for transmitting or receiving voice signals and for establishing connections over the telephone network between different transceiving units. The hybrid network 101 isolates the outgoing and incoming signals.

The forward and reverse signals which are received by the transceiver 10 are applied through a preamplifier 103 to an automatic equalization means 104 and the reverse channel receiver means 62. The phase versus frequency and attenuation versus frequency distortions which are encountered on the transmission line are automatically compensated for through the use of the equalization circuit means 104 at the receiver. This means operates in response to the automatic equalizing pulses 80 (FIG. 3) which are transmitted prior to the transmission of synchronizing and video information. These pulses have a relatively short duration with respect to the repetition period. They are sensed by an automatic equalization network control means 105. The equalization control means automatically obtains a measure of the distortions encountered by these pulses and properly equalizes the line in order to compensate for the distortions. The details of this equalization network are described and claimed in copending U.S. patent application Ser. No. 214,146 filed on Dec. 30, 1971, now U.S. Pat. No. 3,798,576, which is assigned to the assignee of this invention.

Forward signaling information which has been transmitted through the equalization means is applied via a line 106 to a conventional limiter 108 and zero crossing detector 110 for demodulating the frequency modulated input signal. An output from the zero crossing detector is applied to a low-pass post detection filter 112 which provides a relatively short term average of output pulses from the zero crossing detector. This filter preferably has a peaking characteristic for enhancing the response at the higher element or transmission rates. This characteristic compensates for a decrease in signal amplitude resulting from a rejection by the bandwidth limited transmission medium of all but the fundamental frequency components of the highest results of video signal. The demodulated output signal from this filter is applied to a video signal decoder 114 which comprises a conventional full wave rectifier. The demodulated alternate analogue encoded video signal which is applied to the decoder 114 has an output comprising a signal which can be utilized by the printer portion of the transceiver. This decoded signal is applied via a gate 116 to a half tone circuit 236 of the apparatus, discussed hereafter.

Figure 6:
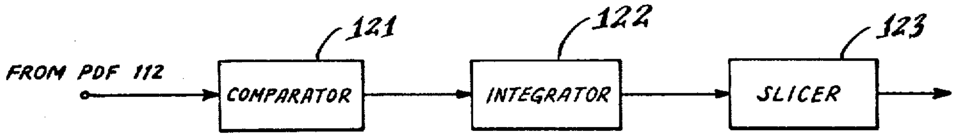
FIG. 6 is a block diagram illustrating a carrier detector component of the transceiver apparatus of FIG. 5A.

There is coupled to a forward signaling receiving means 64 an output from a control detector, signal detector filter 119 and an output from the post detection filter 112. The post detection filter output is applied to a carrier detector 120 and to an unattended sending signal detector 122, discussed hereinafter. These two detectors can have inputs from either of the filters 112 or 119. The carrier detector 120 is a level detector for detecting the demodulated level of the carrier frequency $f_4$ as illustrated in FIG. 3. The carrier detector circuit which is illustrated in detail in FIG. 6 comprises a comparator circuit 121 which when actuated by a DC level for post detection filter 112 applies a step to integrator circuit 122. This signal is then applied to a slicer circuit 123. This circuit provides a time constant sufficiently long for insuring a valid indication and for protecting against a false activation by line noise. At the end of the validation period, the pulse width of the zero crossing detector 110 is automatically increased thus enabling lower frequency components to maintain the carrier detector in an on condition. Thus the carrier detector circuit is turned on at the initiation of a transmission by a tone at a relatively high frequency end of the band and is maintained in this condition by frequencies above the center of the band which includes the lowest video signalling frequency. The receiver is then switched automatically from a standby to an operating condition. The carrier detector is turned off by the absence of energy in a band or energy which occurs below the center of the band. The detector 110 thus exhibits two operating sensitivities. An output of this detector is also applied to the automatic equalization control for utilization in starting equalization and to the data set interface 118 as control data input.

The control signal detection filter 119 is provided with a relatively lower frequency cutoff characteristic than the post detection filter in order to remove the higher frequency components from the demodulated signal and thereby provides more reliable information for the control detectors, as for example, less synchronization jitter. The output of this filter is applied to a synchronizing signal level detector 124 which detects the occurrence of synchronizing pulses.

Figure 7:
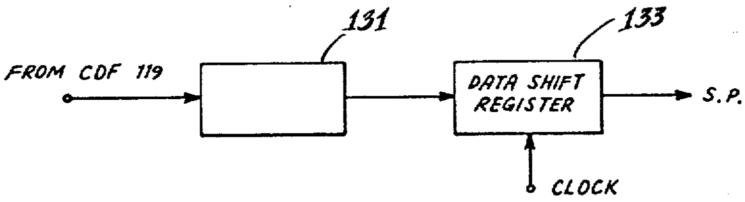
FIG. 7 is a block diagram illustrating a scan pitch detector component of the transceiver apparatus of FIG. 5A.

An output from the synchronizing signal level detector 124 is applied to a document-coming detector 128 and to an end of transmission detector 130. The synchronizing signal detector circuit comprises a comparator circuit removing the synchronizing signal component which extends below the video. The scan pitch detector 126 whose input is taken from control detector filter 119 illustrated in detail in FIG. 7 comprises a level detector for sensing the occurrence of levels 86 or 88 (FIG. 4A) thereby providing an output indication of the scan pitch of the sending transceiving unit. Scan pitch detection is performed within a predetermined number of scans prior to framing. The scan pitch detection circuit includes a comparator circuit 131 which provides scan pitch data for a shift register 133. The data is clocked each scan at a time coincident with the trailing edge of recording sync. After providing for a proper validation interval, the scan pitch information is sampled and stored in a memory circuit, not illustrated. The document-coming detector 128 provides an indication that video information will follow a synchronizing pulse and accomplishes this by sensing that the synchronizing pulse has been widened to occupy the time interval $t_2$ plus $t_3$ as illustrated in FIG. 4B. The document coming detection means senses the occurrence of the widened synchronizing pulse by applying recorded sync information to the date input of a shift register similar to the one used in the scan pitch detector. This register is clocked with a sample DCS pulse which occurs within a window in which the corresponding time slot is positioned. This sampling pulse is provided by a time-based generator which is discussed hereinafter. The occurrence of the widened synchronizing pulse results in a delayed indication of document coming to the shift register while the absence of the pulse results in a delayed indication of document-not-coming. The time-delay provided by this register is, for example, approximately six widened synchronizing signals. In order to condition the receiving unit for reception of the video information, a leading edge of a document being scanned actuates a switching means which initiates the operation of circuit means for causing the delayed generation of six such synchronizing pulses during an interval of time in which the leading edge of the document is advanced from the switching station to the scanning station. The switch which is illustrated in copending U.S. patent application Ser. No. 253,828, filed May 16, 1972, and assigned to the assignee of this invention is spaced from the scanning station by a distance which, when considering the delay, will be traversed by the leading edge of the document within the time interval of six widened synchronizing pulses. Thus, as the leading edge of the document at the transmitter reaches the scanning station, the receiver is conditioned for receiving video information. At the end of a transmission, the trailing edge of a document will release the switching means at the transmitter again actuating the circuit means and terminating the generation of the widened pulse. During the interval of time within which the trailing edge of the document reaches the scanning station, the shift register referred to hereinbefore will have cleared indicating no further video information immediately follows. The end of transmission detector 130 is utilized for sensing a synchronizing signal configuration of the type illustrated in FIG. 4C wherein pulse segments occur during the time intervals $t_2$ and $t_4$. This aspect is considered hereinafter with respect to the optional mode of operation of automatic data feed. The outputs of the detectors 126, 128 and 130 are applied to the data set interface for control purposes discussed hereinafter. An output signal from the control detector filter 119 is also applied to a compatibility detector 132, the purpose of which is discussed hereinafter with respect to a compatibility mode of operation.

Figure 8:
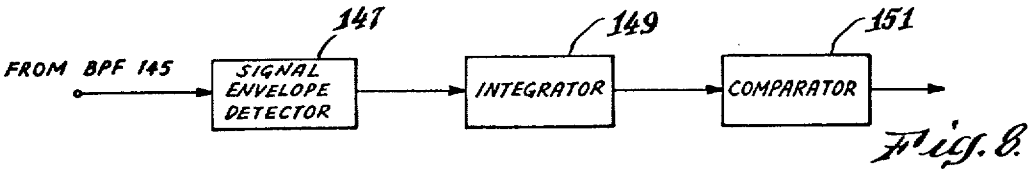
FIG. 8 is a block diagram illustrating an acknowledge signal detector component of the transceiver apparatus of FIG. 5A.

The reverse channel signal receiver indicated within the dashed line and referenced generally as 62 includes means for recognizing a reverse acknowledge signal and means for sensing an emergency stop signal. An acknowledge signal will be received by the sending unit in the principal mode of operation when the originating operator establishes communication with the printing unit. An acknowledge signal is also automatically transmitted by the printing unit when synchronization has been obtained and the printer is in a printer-ready condition. This printer-ready condition will be generated before each document is transmitted. The reverse acknowledge signal for example comprises signal bursts below the video frequencies. The initial acknowledging signal in response to ringing in the principal mode of operation comprises a burst of 1 second in a 3 second period while a printer-ready acknowledge signal comprises a burst at the same frequency of for example one-sixth of a second in a 3 second interval. A preamplified input signal is applied to the acknowledge detector 143 through a band pass filter 145. The acknowledge detector circuit 143 as indicated in FIG. 8 comprises a signal envelope detector 147, an integrator 149 which provides detection validation and a comparator circuit 151 which provides the output. The output of the acknowledge detector is coupled to the data set interface 118 for control purposes.

Emergency stopping in the principal mode of operation is accomplished either manually or automatically. Both the transmitting transceiver and the receiving transceiver can initiate an automatic stop of a unit with which it is communicating. The manual stop is affected by an attending operator who depresses an emergency stop button at the sending unit or printing unit thereby terminating further scanning or processing and automatically restoring the units to standby printer mode. In addition, a number of scanner and printer faults are automatically detected and an emergency stop signal is automatically generated. When the stop is initiated at a printing unit, a reverse stop signal is transmitted in a direction to the scanning unit. The stopping condition results in the illumination of a local stop or remote stop lamp depending on where the stop condition originates. The stop condition also causes an audible alarm to be sounded except at a unit where the emergency stop button is pressed. The generation of the emergency stop signal is initiated by fault detectors which cause a control unit of the transceiver to generate an emergency stop.

A reverse signal emergency stop is coupled from the preamplifier 103 to a band pass filter 153 and then through a stop detecting circuit means 155. This emergency stop detection means includes a signal envelope detector, an integrator and a comparator similar to that described above with respect to FIG. 8. An output of the stop detector 155 is coupled to the data set interface 118 for control purposes as indicated.

Figures 9, 10:
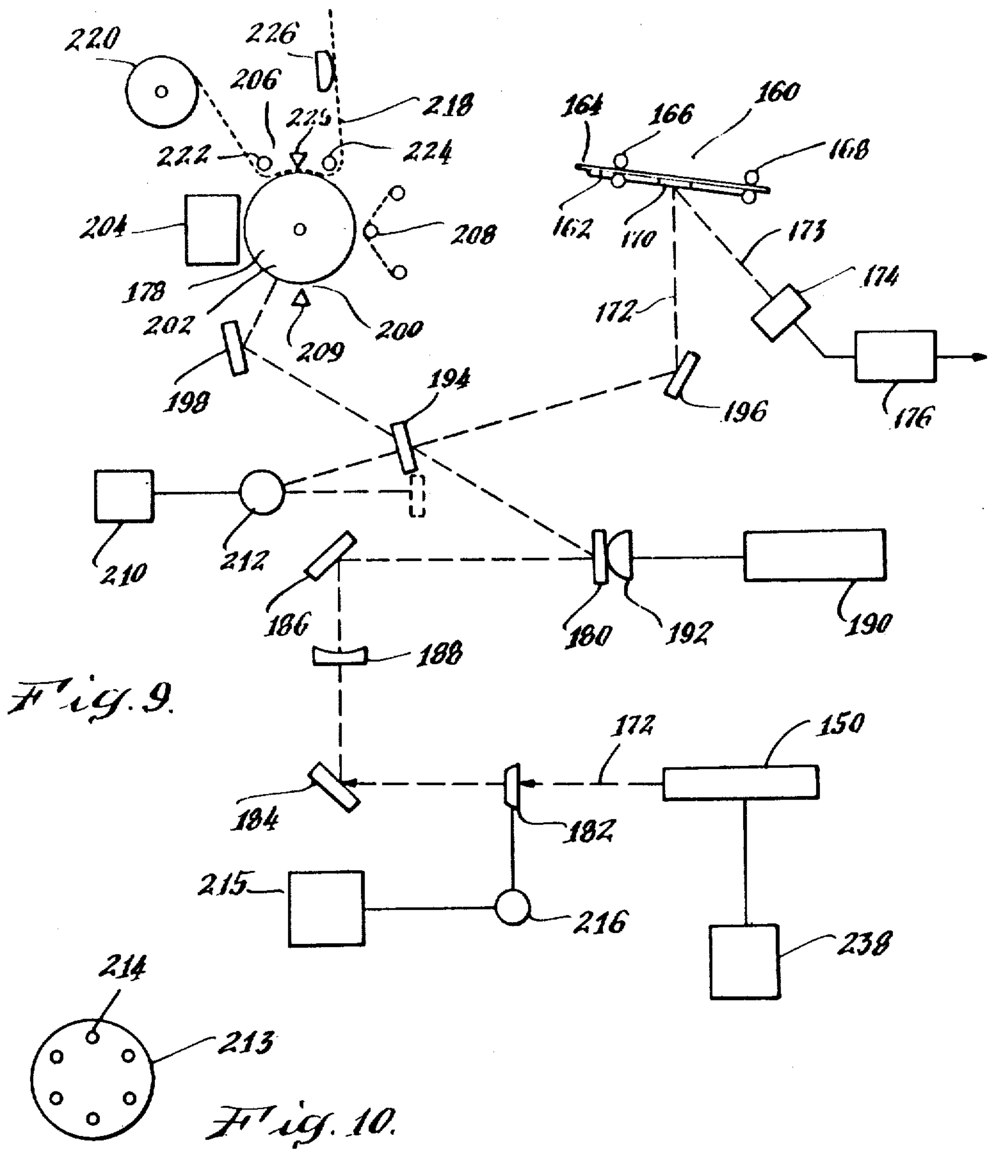
FIG. 9 is a schematic diagram illustrating a document scanner and xerographic printing means employed with the transceiver apparatus of this invention.
FIG. 10 is a view of a filter element employed with the apparatus of FIG. 9.

In addition to the data set thus described and referenced generally as 140 in FIG. 5B, the transceiver 10 includes a laser scanning means and xerographic processing system shown within the dashed rectangle and referenced generally as 142 and an operator control and indicating section referenced generally as 148. The transceiving apparatus of the present system utilizes a laser scanning system for alternatively scanning a document which is to be transmitted during a sending mode of operation or for imaging a document on a xerographic drum in a printing mode of operation. The laser scanner includes a laser light source 150, a scanning means referenced generally as 90 in FIG. 5B and an optical section referenced generally as 154 in FIG. 5B for projecting the laser light beam from the source 150 toward a scanning station during a sending mode of operation or alternatively for projecting the beam toward a printing station during a receiving mode of operation. Printing is accomplished by a xerographic processor referenced generally as 156 in FIG. 5B. In order that the time base, framing, and sweep generating section 144 and the control sections 146 and 148 may be more fully appreciated, a brief description of the laser scanner and xerographic processor will be given with reference to FIGS. 9 and 10. Referring now to FIG. 9, there is provided at a scanning station 160 a platen surface 162 upon which a document 164 which is to be transmitted is positioned and is advanced past a slot formed in the platen. The document is advanced by suitable transport means such as pinch roller assemblies 166 and 168. A strip 170 of transparent material such as glass extends across the width of the platen 162 and is coincident with the slot formed therein. The slot and strip extend in a direction generally perpendicular to the direction of transport of the document 164 and for a distance at least equal to one of the dimensions in the document. As the document is thus transported past the station 160, a relatively narrow light beam 172 is projected at and is repetitively scanned across the transparent strip 170 thus illuminating the narrow strip of the document. These light components 173 which are reflected from the document are incident upon a photodetector 174 which extends coextensively with the strip 170 and is positioned for impingement thereon by the reflected light component 173. As the beam scans across the strip 170, an output signal will be developed along the length of the photodetector and a serial form of video signal will therefore be generated by the photodetector. This signal undergoes amplification, signal shaping, automatic background control and DC restoration by circuit means 176 and is then applied to the data set 140.

The laser light source 150 for scanning the document comprises for example a relatively low power level helium neon laser light source. An output light beam 172 from this laser source is projected toward the scanning station 160 when the transceiver is operating in a scanning and transmitting mode and toward a photoreceptor surface on a xerographic drum 178 when the transceiver is operating in a receiving and printing mode. The light beam 172 from the laser is projected toward a galvonometer actuated reflective surface 180. The beam is projected toward this surface 180 through a filter 183 and by reflective mirrors 184 and 186. An anamorphic lens 188 is positioned in the projection path of the light beam for establishing a generally elliptically shaped cross section for the beam. This lens provides a cross sectional area having a major axis extending generally in a direction perpendicular to the direction of scanning and therefore contributes to an increase in scanning resolution during both the scanning of a document and the reproduction of a document.

A current having a ramp shaped waveform is generated by a sweep generator 190, and is applied to a deflection coil, not illustrated, of a galvonometer 192. The galvonometer is thereby linearly deflected in a first direction and then rapidly returns to a starting point for initiating a repetitive scan. The reflective surface 180 which is supported by the deflected galvonometer coil is accordingly deflected and causes the light beam 172 to be similarly deflected. The scanning light beam is reflected from the surface 180 and is projected toward the strip 170 by a reflective mirror 194 and a mirror 196. The mirror 194 has a scanning position as illustrated by the solid lines in FIG. 9 and a printing position as illustrated by the dashed lines. When located in the scanning position, the light beam 172 is reflected by the mirror 194 toward the strip 170. When the mirror 194 is located in the printing position, the beam 172 does not impinge upon this surface but rather is projected toward a print mirror 198 by which it is reflected toward an imaging station of the electrostatic drum 178.

The electrostatographic processor 156 is adapted for forming an image by electrostatographic techniques taught generally by Carlson in U.S. Pat. No. 2,297,691. In general, a uniform electrostatic charge is established on a photoreceptor and the charge is then discharged in image configuration by exposure to activating electromagnetic radiation. An image remaining on the photoreceptor surface is developed by contacting the surface with electroscopic toner particles. The developed image is then transferred to and fixed to a record medium.

A photoreceptor surface is formed on a surface of the drum 178. The drum is positioned for rotation about an axis thereof past a charging station 200, an image exposure station 202, a developing station 204, an image transfer and fusing station 206 and a cleaning station 208. A corona charging device 209 is positioned at the charging station 200 in relatively close proximity with the photoreceptor surface. The charging device comprises a scorotron which provides a relatively uniform electrostatic charge on the surface of the rotating drum. The scorotron is advantageous in this application in that a uniform charge will be established on the drum during variable speed operation of the drum. As indicated hereinbefore, the transceiver is adaptable for operating at different scan rates. In addition, upon completion of the transmission of the transmission of the video information and imaging and developing of a last document on a drum, the drum can be rotated at an accelerated rate in order to expedite the transfer of the image.

An image is established on the drum by periodically scanning the laser light beam 172 across the surface of the drum. During a receiving and printing mode of operation, a mirror position control means 210 actuates a motor 212 which causes displacement of the scanning mirror 194 to a position as indicated by the dotted lines thereby permitting the beam 172 to be projected from the galvonometer reflector surface 180 toward the print mirror 198. The galvonometer 192 is energized by the same sweep generator 190 which causes scanning of the laser light beam when the transceiver operates in a scanning or transmitting mode.

The xerographic printing means is adapted to print at different rates in accordance with the document transmission rate of the sending transceiver. The drum 178 is adapted to be rotated at different rates and the scanning laser light beam intensity must be reduced when scanning at the relatively lower scanning rates with respect to its intensity when scanning at the relatively higher scanning rates in order to provide uniform exposure of the photoreceptor at the different scanning rates. The filter 182 is provided in order to reduce the intensity of the light beam in accordance with the scanning rate and line pitch for a particular mode of operation. The filter comprises a turret 213 (FIG. 10) having a plurality of apertures and filter elements 214 mounted therein of different intensity attenuation characteristics. A filter wheel position control means 215 applies an energizing potential to a drive motor 216 for rotating the turret 213 to a position for establishing in the path of the light beam 172 a filter element 214 having a desired attenuation characteristic for the scanning rate and line pitch of operation. The scanning laser light beam forms a latent electrostatic image on the photoreceptor surface in accordance with the modulation information applied to the laser. The laser modulation and control is described in more detail hereinafter.

An electrostatic image thus formed at the exposure station 202 is advanced to the developing station 204 where electroscopic toner particles are applied to the photoreceptor surface for developing the electrostatic latent image. The developer means preferably comprises a magnetic brush developer. A developer material comprising carrier beads in a pigmented electroscopic toner material which adheres thereto is formed into a brush by a magnetic field which causes the brush to contact the drum surface. The toner particles are thus attracted to the photoreceptor surface in image configuration and the image is thereby developed.

The developed image is rotated by the drum to the image transfer station 206 at which location the developed image is transferred to a record medium. The record medium comprises a paper web 218 for example which is supplied from a reel 220 and which is fed between idler wheels 222 and 224 and the surface of the drum at the transfer station 206. An electrostatic field is established at this location by a corotron 225 which causes transfer of the toner particles in image configuration from the photoreceptor surface to the paper web. The paper is then advanced to a fusing station 226 wherein the toner particles in image configuration on the paper web are heated in order to fix the image to the record medium. A cleaning web is provided at the cleaning station 208 for removing residual particles from the drum. The document scanning and xerographic processing arrangement of FIG. 9 is described in greater detail and is claimed in previously referred-to copending U.S. patent application Ser. No. 253,838.

Referring once again to FIG. 5B, a time base 228 is provided and comprises a crystal controlled oscillator along with counter means which are under the control of a mode of operation signal derived from a sequence control and a scan pitch signal derived from the data set during a receive mode. The signals program the time base for providing the required forward scanning time period and retrace time period for the document transmission rate employed. There are two rates of document transmission in the principal mode of operation. These are for example, 3 minutes per document and 2 minutes per document. While the rate of transmission can be expressed in the number of minutes per document, a transceiver operates at these rates by virtue of the scanning pitch or lines per inch at which scanning is accomplished and the scanning rate or the number of line scans per second. In the principal mode of operation, transceiver is adapted for operating at either of two scan pitches and either of two scanning rates, the combination of which provide for document transmission rates, at least two of which are employed in the principal mode of operation. For example, the scanning pitch may comprise 96 lines per inch and 77 lines per inch while the scanning rate comprise six scans per second and 7.2 scans per second. At a scan pitch of 77 lines per inch and a scanning rate of 7.2 scans per second, the apparatus will operate at a document transmission rate of approximately 2 mintues a document. At the scanning pitch of 96 lines per inch and a scanning rate of six scans per second, the transceiver will operate at a document transmission rate of approximately three mintues per document.

The time base 228 further provides the basic timing for the automatic equalizing pulses 80 (FIG. 3), the frequency of a triangular wave shaped generator incorporated in a half tone video circuit described hereinafter, for the ramp generator 190 for the galvonometer and stepping pulses for advance of the photoreceptor surface of the drum 178 in the print mode and stepping of a document paper drive in the scan mode. In addition, the time base generates a locally utilized synchronization pulse which resets a galvonometer for repositioning the laser beam at the leading edge of the document and initiates laser blanking. In addition, the synchronizing pulse is decoded into four equal time periods by the time base 228 and referred to as $t_1$, $t_2$, $t_3$ and $t_4$ (FIG. 4).

A framing means 230 is provided for establishing overall framing of the video signal. The framing means produces synchronization and detects when synchronization exists between the scanning and printing units. When an out-of synchronization condition is detected, it causes the printing unit to attempt to reframe or resynchronize its operation with that of the scanning unit. This framing means operates in a starting mode and in a running mode. In the starting mode it provides phasing on the first received synchronizing pulses by resetting the receiver time base counter to synchronize with the scanner time base counters. In the running mode of operation, the framing means provides for correction of the framing by the time base by inserting a predetermined number of counters in a countdown chain in the time base. This operation either increases or decreases the scan time in the receiver. The framing means provides a fly wheel effect wherein it looks at four consecutive pulses in a window constituting an in-frame condition and will sense four consecutive pulses outside the same window which constitutes an out-of-frame condition. If out-of-frame is detected, reframing is accomplished by reseting the time base counters.

As indicated hereinbefore a printer ready signal is generated for acknowledgeing to the transmitting unit the ready status of the receiving unit for accepting a video transmission. This condition will exist if framing has been accomplished and consumable items such as the copy paper and cleaning web paper are present and available during the operation, the fusing station is heating, the scanning mirror 194 is properly positioned, and the filter turret 213 is properly positioned. When these conditions exist and the drum has rotated from the charging station to the scanning station, a printer ready signal will be generated.

Figure 11:
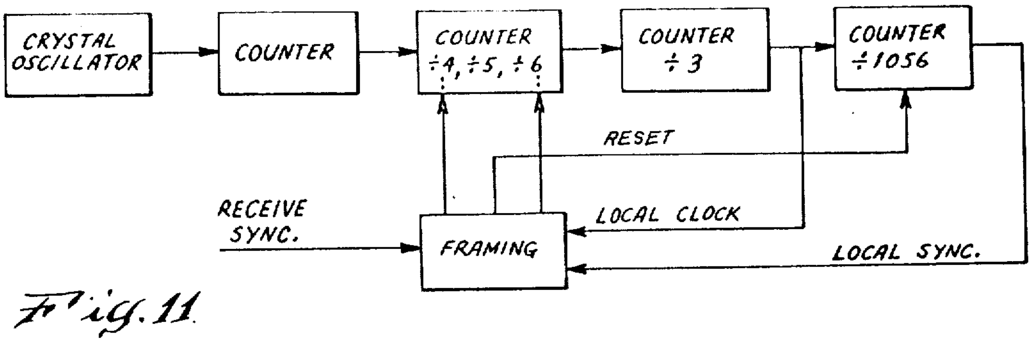
FIG. 11 is a block diagram of a framing circuit of the transceiver of FIG. 5B.
Figure 12:
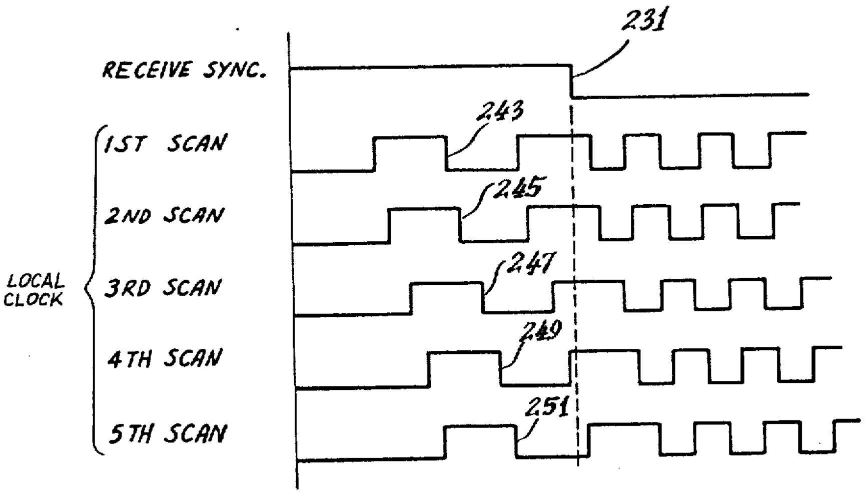
FIG. 12 is a diagram illustrating the timing of locally generated clock signals with respect to a received synchronizing signal.
Figure 13:
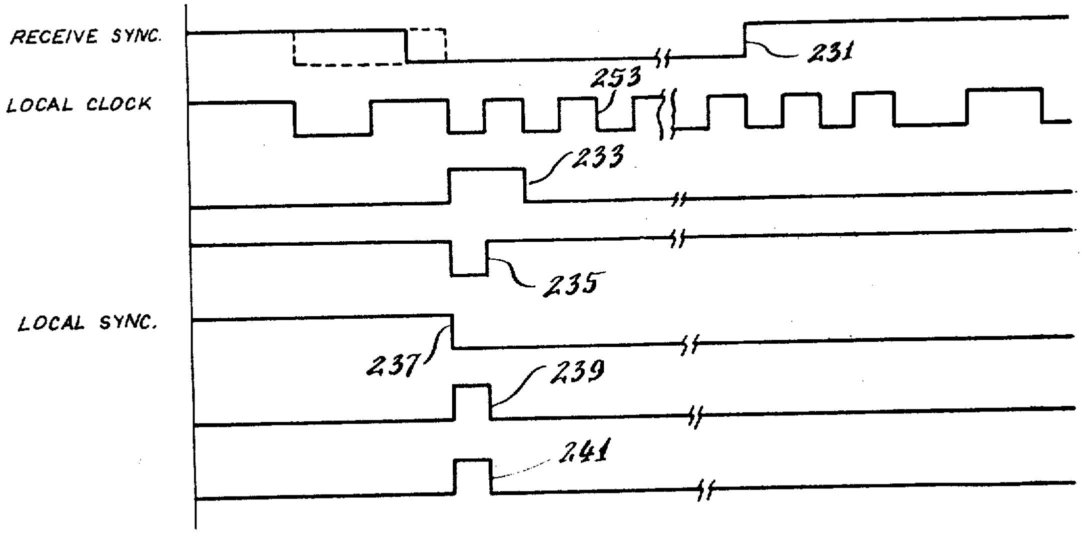
FIG. 13 is a timing diagram illustrating the initial synchronization of the transceiver of FIG. 5.

The framing operation is more fully described in conjunction with the circuit diagram of FIG. 11 and the timing waveform diagrams of FIGS. 12 and 13. The framing circuit arrangement is adapted so as to be active only during the receiving mode. Initial synchronization between the scanning means at the transmitting unit and the printing means at the receiving unit occurs when the framing circuit detects transmitted sync pulses. The transmitted synchronizing pluse 231 of FIG. 13 is employed by the framing circuit in order to derive a relatively narrow pulse 233 which is used as a "window" for the purpose of line by line synchronization as is more fully described hereinafter. This relative narrow pulse is modified as illustrated by the pulse 235 of FIG. 13 and is employed to reset the time base for causing synchronization between the scanning unit and the printer. In a transmission which is relatively ideal and wherein the transmission is free of noise which would otherwise distort transmission, the pulse 235 resets the time base once during the transmission. A locally generated synchronizing pulse 237 is utilized by the framing circuit to derive a relatively narrow pulse 239. The coincidence of the pulse 239 and the narrow pulse 235 derived from the received synchronizing signal results in the generation of a pulse 241 which indicates to another portion of the framing circuit that the scanning and a printing means are in synchronization. The framing circuit counts four consecutive pulses 241 and indicates to the machine control logic that the scanner and printer are synchronized. After this has been determined, the framing circuit further senses for a noncoincidence of the pulses 235 and 239. Four consecutive instances of noncoincidence of pulses 235 and 239 will indicate to the machine control that the scanner and the printer are no longer synchronized and the framing circuit will permit resetting of the receiver time base or synchronization of the receiver sync pulse is still present.

Line by line synchronization is provided so that a continuous document, as for example a document in the form of a continuous roll of paper, may be transmitted and received with an insignificant amount of skew. Moreover, the line by line synchronization provides an additional function of correcting for differences in the crystal frequencies between the scanner and printer due to variations in temperature at these units. Line by line synchronization is accomplished through the framing circuit and the time base in the following manner. The framing circuit examines the location of the received synchronizing pulse 231 (FIG. 12) with respect to the polarity of local clock pulses (FIG. 12) 243, 245, 247, 249 and 251. These clock pulses are derived from a local time base, clock, not illustrated. Depending upon the polarity of the local clock at the transition time of the received sync pulse, the framing circuit will insert a predetermined number of counters in the local time base network (FIG. 11). This action lengthens or shortens the scan period of the receiver with respect to the scan period of the scanner. Thus, if the scan period of the receiver is shorter than the scan period of the scanning unit, the framing circuit will insure that the succeeding scanning period at the receiver is made longer than the scanning period at the scanning unit. On the other hand, if the scan period at the receiver is longer than that of the scan period at the scanning unit, the framing circuit will insure that the succeeding scan period in the receiver will be shorter than the scan period of the scanning unit. The foregoing is illustrated in the timing diagram of FIG. 12 which shows the effect of the framing pulse. More particularly, the dotted line of FIG. 12 illustrates line by line sync correction as it occurs for the duration of the transmission. That is, the fourth scan will be timed as indicated by the pulse 249, the fifth scan will be timed as indicated by the pulse 251, etc.

It is noted that a local framing clock is arranged for providing a plurality of frequencies as illustrated by the pulse train 253 of FIG. 13 and by the pulses 243 through 251 of FIG. 12. The purpose of the framing clock is to provide allowance for jitter in the receive synchronizing pulse thereby increasing the reliability of the framing circuit. Since the pulse at the scanner may be sent at very accurate time intervals but the actual transmission may vary due to a variable delay introduced by the transmission medium. Referring to FIG. 13, the dotted line indicates when a received synchronizing pulse may occur and the maintainence of the time positions of the pulses 233 through 241.

Transceiver control means for controlling the various functions of the transceiver include a coupler control 232 which controls the status of the coupler 14, monitors the status of the transmission path through the coupler, and responds to a ringing indicator generated by the coupler 14. An electromechanical control means 234 is provided for controlling the energization of the motors, clutches and relay controls for the xerographic processor 156, the scanner and the optical system 154. The advancement of a document in a feed tray near the reading station is accomplished by a clutch control drive, not illustrated, which advances the document 164 (FIG. 9) to the pinch drive rolls. In addition, electrically responsive clutch means are provided for coupling a motive force from a stepping motor to the xerographic drum 178. The electromechanical controls 234 additionally generate control signals and monitor responses for fault detection and monitors the supply of consumable items as for example, the supply of paper web used as a record medium or the supply of a paper web employed as a cleaning mechanism for the xerographic drum.

Figure 14:
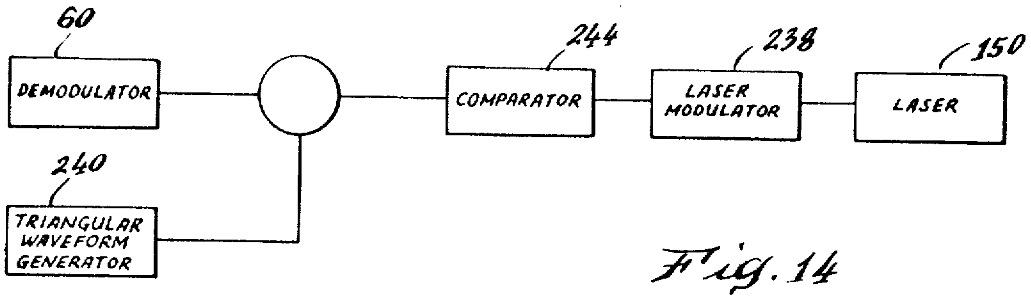
FIG. 14 is a block diagram illustrating an arrangement for converting an analog signal to a two level half tone control signal.
Figure 15:
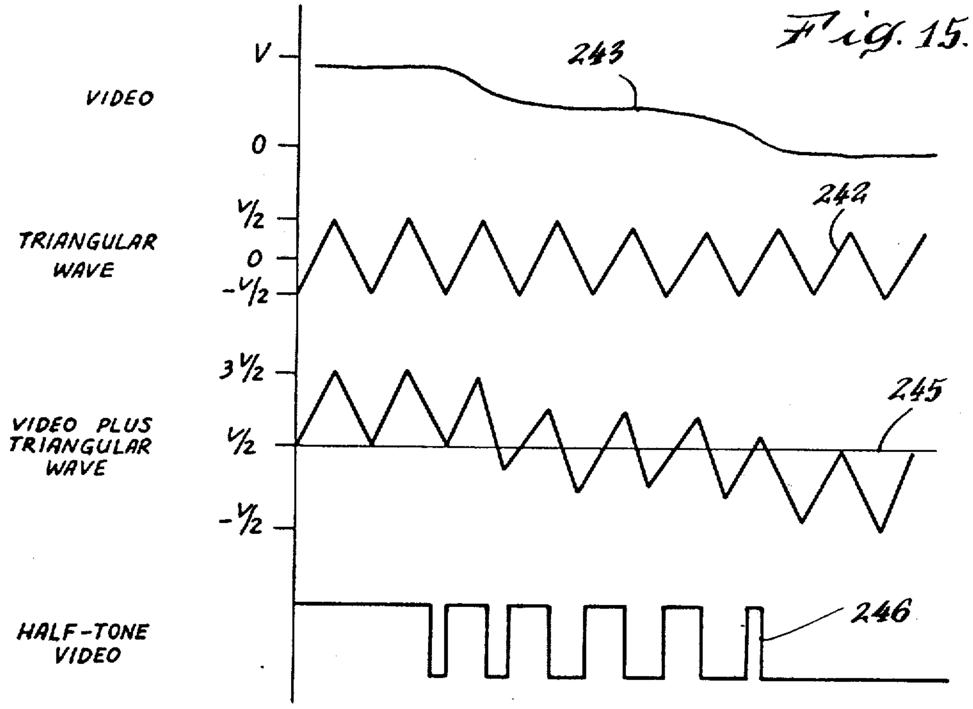
FIG. 15 is a diagram illustrating signalling waveforms occurring at various locations in the circuit arrangement of FIG. 14.

A feature of the facsimile system of this invention is the provision of gray scale rendition in a xerographic reproduction system by the means of halftone imaging. The detected video signal is coupled from the data set 140 to a half toning means 236 which supplies an output thereof to a laser control circuit means 238. A halftoning means and associated waveforms is illustrated in FIGS. 14 and 15. A triangular waveform generating means 240 provides an output signal having a triangular wave shape 242 (FIG. 15) at a frequency which is approximately twice the bandwidth of the transmitted video signal. The video signal 243, which is derived from the demodulator 60 is applied to the half toning circuit wherein it is added to the triangular wave shaped signal 242. The sum of these signals is compared by a comparator means 244 with a signal level 245 established at a mean value of the video signal and a two level signal 246 of varying duty cycle is thereby generated. This signal 246 comprises a half-tone signal which is utilized to represent gray tones by a dot pattern having the appropriate spatial duty ratio. The signal is applied to the laser control 238 for controlling the intensity of the output beam of the laser.

Figure 16:
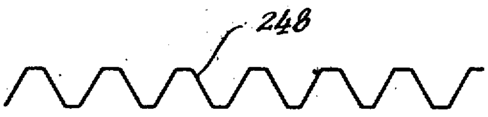
FIG. 16 is a diagram illustrating a modified triangular waveform of FIG. 15.
Figure 17:
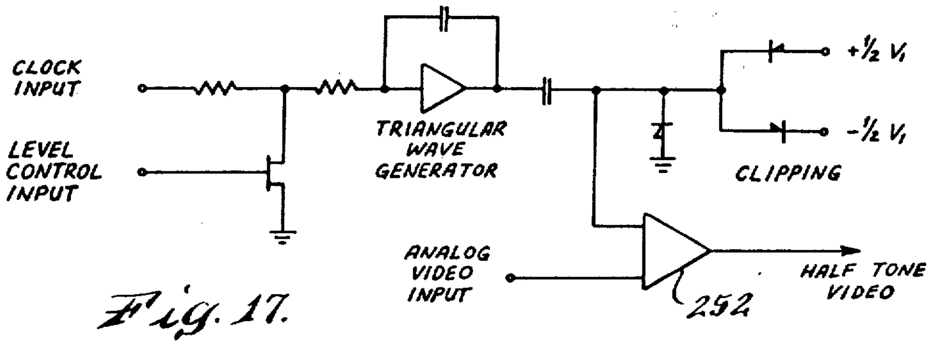
FIG. 17 is a circuit diagram illustrating a particular embodiment of the circuit arrangement of FIG. 14.

An alternative circuit means is provided which limits or clips the triangular wave signal resulting in the waveform 248 as illustrated in FIG. 16. Copy quality is improved if the clipped waveform 248 is applied in place of the triangular waveform 242. A circuit arrangement for providing the signal 246 from the clipped triangular wave signal is illustrated in FIG. 17. In the circuit illustrated in FIG. 17, the clipped triangular wave and video signal are not added but rather the analog video is compared with the sawtooth signal. An operational amplifier 250 generates a triangular sawtooth waveform which is clipped and compared with the analog video signal in the comparator 252 in order to provide the halftone video output 246.

Referring once again to FIG. 5B, the internal control means furtherinclude a fault detection means 254 for sampling significant conditions within the transceiver and for generating warning indications to the sequence control 97. These warning indications can result in the generation of a local stop signal which terminates operation of the local unit and also results in the generation of an emergency stop signal for transmission to a remote unit.

The sequence control means 97 controls the various operational states of the different components of the transceiver. It controls those operational states such as scan versus print, speed of document transmission and compatibility. In accomplishing this, the sequence control monitors each step of the various operational sequences.

Additionally, the sequence control provides an automatic disconnect operation and times out scheduled and unscheduled returns to a printer standby state with an integral timer. At appropriate points in the operating sequences, a timer is started. When a next expected stop or operation in the sequence occurs, the timer is automatically restarted. The required events which should occur may comprise operator actions or they may comprise automatic steps to be performed by the machine. If the expected event does not occur within a time out period as for example 30 seconds, the machine is automatically disconnected and returned to a standby printer state. In the principal mode of operation, the operating sequence includes an automatic exchange of handshaking signals between the scanning unit and printing unit before each document is transmitted. By automatically returning the transceiving apparatus to a standby printer state, the apparatus is disconnected from the telephone line 12 and therefore increases the economics of operation of the system by minimizing the transmission line time which can go unutilized due to a fault or other delay.

The sequence control 97 further responds to operations initiated by transceiver attendant. During the principal mode of operation the attendant loads a document in the document tray, selects a document transmission rate with a selector switch and initiates operation by depressing the start button 256. This selection of operating speed at the scanner automatically causes the printer unit to adjust to the speed of the sender as detected in the format of the encoded sync signal as described above. An operator initiated emergency stop, referred to hereinbefore, is also initiated by depressing a button of the control unit 148. Various operating status and fault indicator display lights are provided on the control means 148.

It may be readily appreciated that a number of operating procedures are established in accordance with the desired functions with which the operator controls, including the telephone exclusion key are arranged. One particular embodiment is described as an example in order to illustrate the different operational aspects of the transceiver. It is noted however that the details of the operational sequences described hereinafter can vary with different control embodiments. The normal status of the transceiving apparatus and the principal mode of operation is as a standby printer. This status is attained, for example, when an attendant applies power to the apparatus by depressing a power-on button and actuates the telephone exclusion key to the data position. The transceiver automatically is then conditioned to respond to ringing by a remote scanning unit and for acknowledging its condition.

Figure 18:
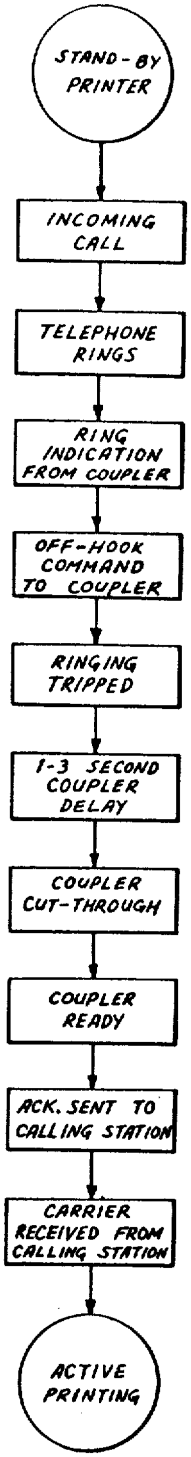
FIGS. 18 through 21 are flow charts illustrating the sequence of events which occur during the operation of the transceiving apparatus of this invention when operating in a principal mode.

The transceiving unit transfers from the standby printing status to an active printing status when signaled by a remote scanning unit. FIG. 18 is a flow chart illustrating an operating sequence of events for transferring the transceiver from a standby printing status to an active printing status in a principal mode of operation. Alternatively, in the principal mode of operation, the transceiving apparatus may function as an attended scanning unit rather than as an unattended printing unit.

Figure 19:
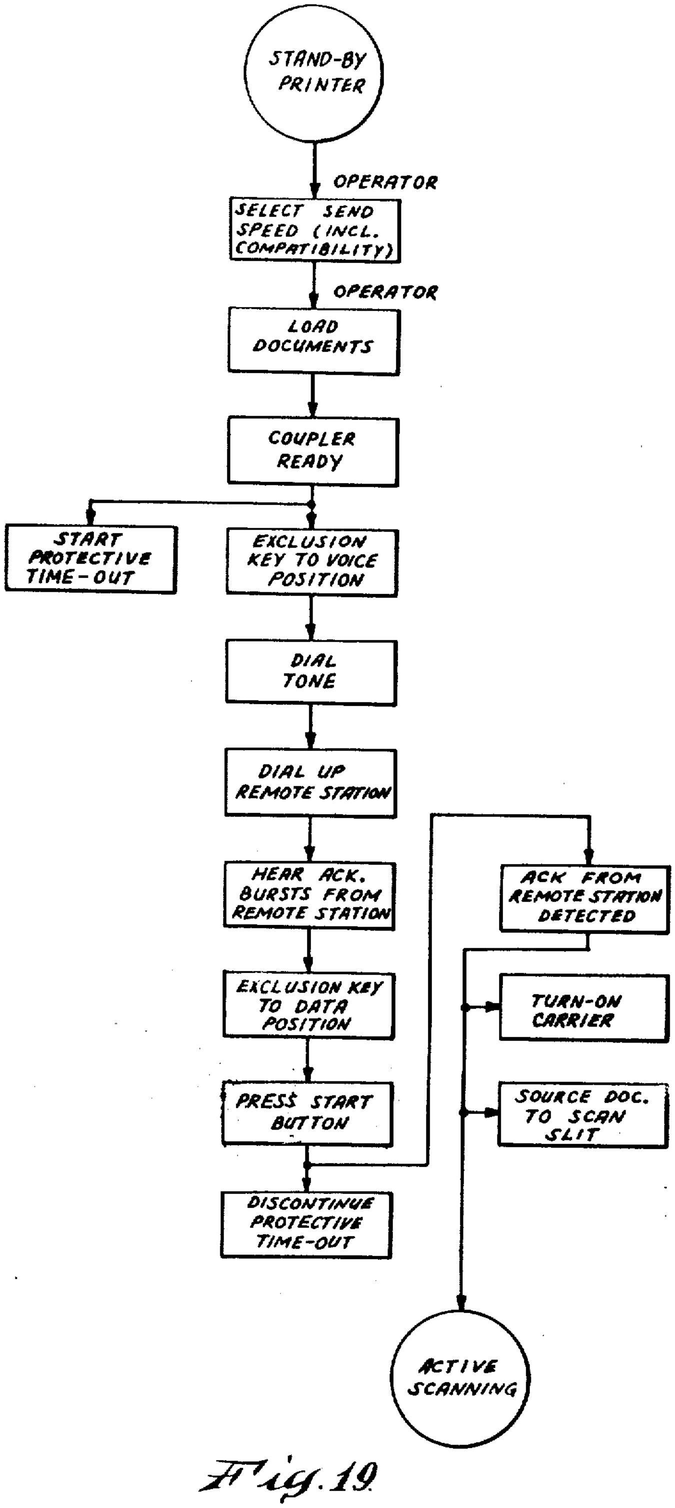

An operating sequence of events for transferring from a printer standby status to an attended active scanning status is illustrated in FIG. 19. The transition is initiated by operator actions. Loading documents cause a coupler ready condition which provides a transmission path through the coupler. Loading of documents is a definitive step which causes the machine to condition itself as a scanner. The telephone line is protected by a 1 minute automatic time-out which prevents holding the line indefinitely if no further action is taken. The time-out is renewable at any time by unloading and reloading the documents. The transmission of acknowledge burst from the remote station is accompanied by the initiation of an automatic time-out at the remote station. The remote station must then receive carrier which is initiated by depressing the start button within the timeout interval. In this principal mode of operation, the acknowledge signal must be detected by the machine after the start button is pressed in order to initiate the transmittal of carrier.

Figures 20, 21:
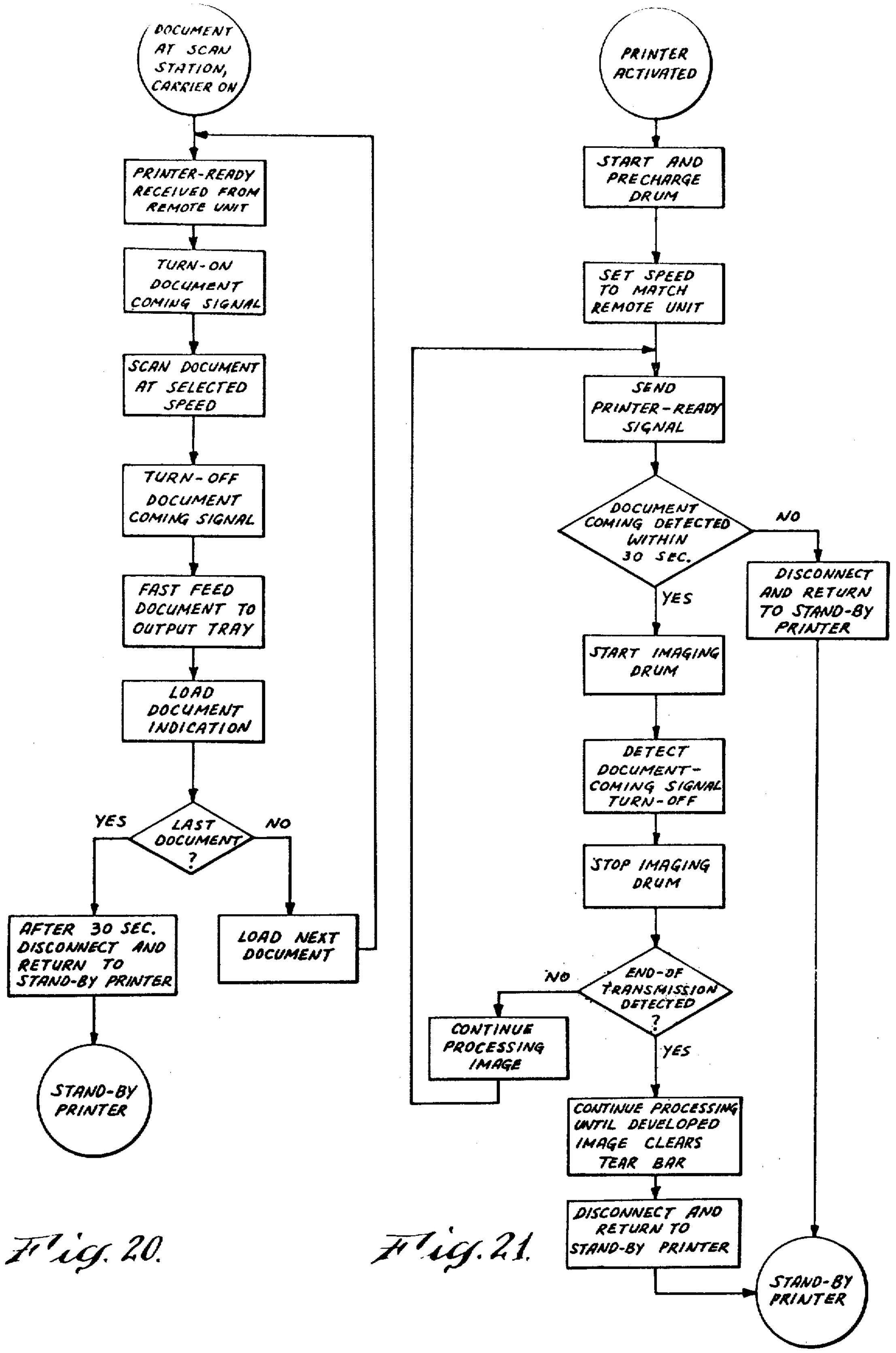

The operating sequence of events during active scanning in the principal mode of operation is illustrated in FIG. 20. In this mode, the operator hand feeds the document which is to be transmitted to the apparatus. Scanning of the first document proceeds automatically upon receiving the printer ready signal from the remote station. Upon completion of the scanning of the single document, the operator is alerted by means of an indicator that a subsequent document may be loaded. If a subsequent document is loaded then the loop 300 is then automatically traversed. On the other hand, if a subsequent document is not loaded within thirty seconds, the transceiver assumes that the last document has been transmitted and returns to a standby printer status.

A printer operating sequence of events in the principal mode of operation is illustrated in FIG. 21. The printing cycle is fully automatic as illustrated. At the end of transmission of a document, the blanking and synchronizing components will continue to be transmitted although video will not be provided. if a widened synchronizing pulse representing a document coming signal is not detected within 30 seconds, the printer automatically disconnects and returns to the printer standby status.

There has thus been described above, the operations of the improved facsimile communication system in its principal mode of operation.

AUTOMATIC DOCUMENT FEEDING OPTIONAL MODE OF OPERATION

As indicated hereinbefore, an optional mode of operation is effected with the use of an automatic document feeding means. The automatic document feeding means comprises, in one example, a mechanism for bottom feeding a document from a stack of documents which are loaded by the operator in a document tray of the transceiving apparatus. An automatic document feeding mechanism of this type is described and claimed in the copending U.S. patent application Ser. No. 253,838 referred to hereinbefore. An operator initiates the transmission of the documents and the documents will automatically be fed to a scanning station and transmitted in sequence to the printer. The transmission of the last document from the stack is followed by an end of transmission indication referred to hereinbefore with respect to FIG. 4C. Referring once again to 4C, it can be observed that the end of transmission signalling configuration comprises the synchronizing pulse occurring in the time interval $t_2$, and absence of a document coming pulse in the interval $t_3$ and the occurrence of a pulse in the interval $t_4$. This signalling configuration is sensed by the end of transmission detector 130 (FIG. 5A) and its presence is coupled to the data set interface 118 for machine control use.

The end of transmission detector 130 of FIG. 5A has applied thereto as an input, the detected synchronizing signal from the synchronizing signal detector 124. The detection of the end of transmission is accomplished by applying the recovered synchronizing information to the data input of a shift register similar to the document carrying detector alone. The information is clocked with a sample pulse within the window of the corresponding time slot. As indicated hereinbefore, the time base 228 is arranged for generating this end of transmission signal. The presence of a pulse within the time slot $t_4$ (FIG. 4) results in a delayed indication of EOT at the output of the shift register while the absence results in a delayed indication of EOT not present. The delay insures the valid indication of the end of transmission.

As indicated hereinbefore, a scanning transceiver in the principal mode of operation will automatically disconnect from the line after about 30 seconds. This interval provides sufficient time for an operator to load another document for scanning while maintaining the transceiver in an operating online condition. However, when utilizing an automatic document feeding mechanism, the feeding of the last document is sensed automatically. This then means to the transceiver that no further documents are to be loaded and scanned and the transceiver utilizes this information to rapidly disconnect after transmitting the last document. The sequencer control is adapted for causing the automatic disconnection of the transceiver in about 2 seconds after the last document has scanned.

When the transceiver is operating as a printer, the printer cycle is longer than the scanning cycle since processing of the electrostatically formed image must continue until all received information is processed out of the machine. Thus, while the scanner may have transmitted the complete document, the full development and transfer of the document from the development surface to the copy paper must be completed. During this interval of time, the printing transceiver is kept on line in order to present a "busy" signal to any new calling transceiver. As indicated, when operating in the principal mode of operation, the printer will automatically disconnect at the end of a thirty second interval following the reception of the end of document. However, when operating with an automatic document feeding means at the scanning transceiver, the printer will automatically disconnect at the end of the processing rather than continue on line for the full 30 second time out interval.

Figure 22:
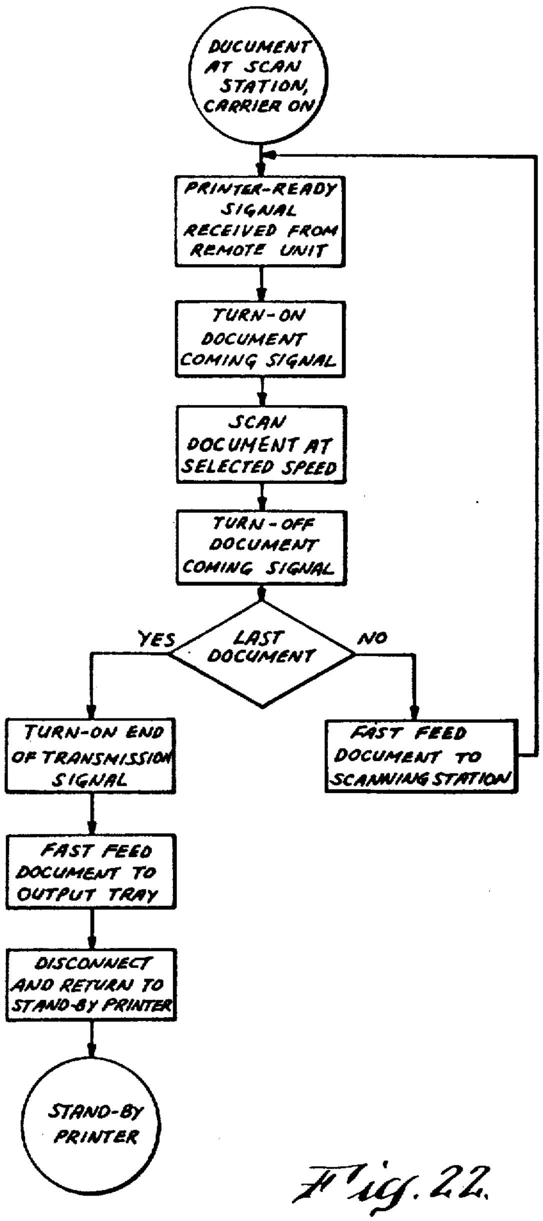
FIG. 22 is a flow chart illustrating the sequence of events which occur during an optional automatic document feeding mode of operation.

There is illustrated in FIG. 22, a flow chart illustrating the operating sequence for scanning with an automatic document feeding means. The transition from a standby printing status to an operating status was illustrated in FIG. 19. Scanning of the first document then proceeds automatically upon the reception of a printer ready signal from the remote station. Upon completion of scanning the first document, the next document is automatically fed to the scanning station and the cycle is repeated. A printer ready signal is received before each document is scanned. Upon completion of scanning the last document, an end of transmission signal is transmitted, as indicated above, while the document is delivered to an output tray. The machine then disconnects immediately and returns to a standby printer status.

UNATTENDED SENDING OPTIONAL MODE OF OPERATION

Figure 23:
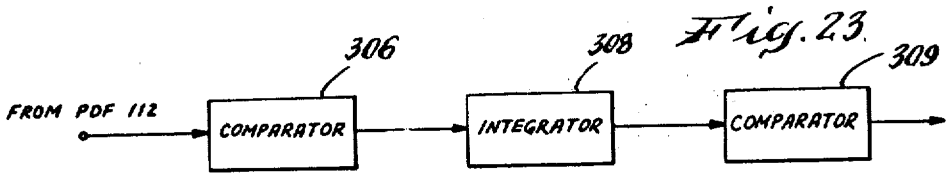
FIG. 23 is a block diagram illustrating an unattended sending detector component utilized with the transceiver arrangement of FIG. 5A.

An alternative optional mode of operation is provided by the transceiving apparatus which is adapted to operate in an unattended sending mode. In this mode of operation, an automatic document feeding means is required for automatically feeding documents to the scanning station for transmission of the documents to a polling station. The transceiving apparatus which will exist in a normal printer status will respond to a polling signal and transfer to an operating scanning status. The unattended sending detector 122 of FIG. 5A receives an input polling signal from the post detection filter 112 of the demodulator circuit arrangement. This signal which is triggered by the trailing portion of an incoming acknowledged signal comprises a tone burst at a frequency $f_3$, for example, and is followed immediately by an acknowledged tone burst of frequency $f_2$, for example, of equal duration. This cycle is repeated, for example, about every three seconds. FIG. 5A illustrates a detector 122 for detecting this polling signal and for providing an output indication to the data set interface 118. The signals at the frequencies $f_2$ and $f_3$ are lower in frequency than the frequency $f_4$ employed for the carrier in the principal mode of operation thus providing their detection as directed from carrier. The polling signal in the modulated form is detected by applying the filter data to the detector 122 which includes as shown in FIG. 23 a comparator circuit 306, which in turn is applied to an integrator unit 308. The integrator output is coupled via a second comparative circuit unit 309 to the data interface 118. A delay provided by the integrator insures valid indication and protects against false activation by line noise. The occurrence of an output signal from this detector results in an indication to the sequencing means 97 which automatically causes the receiver to change from a printing mode to a scanning mode and is conditioned to detect the accompanying acknowledge tone which detection starts the machine in the scan mode.

Figure 24:
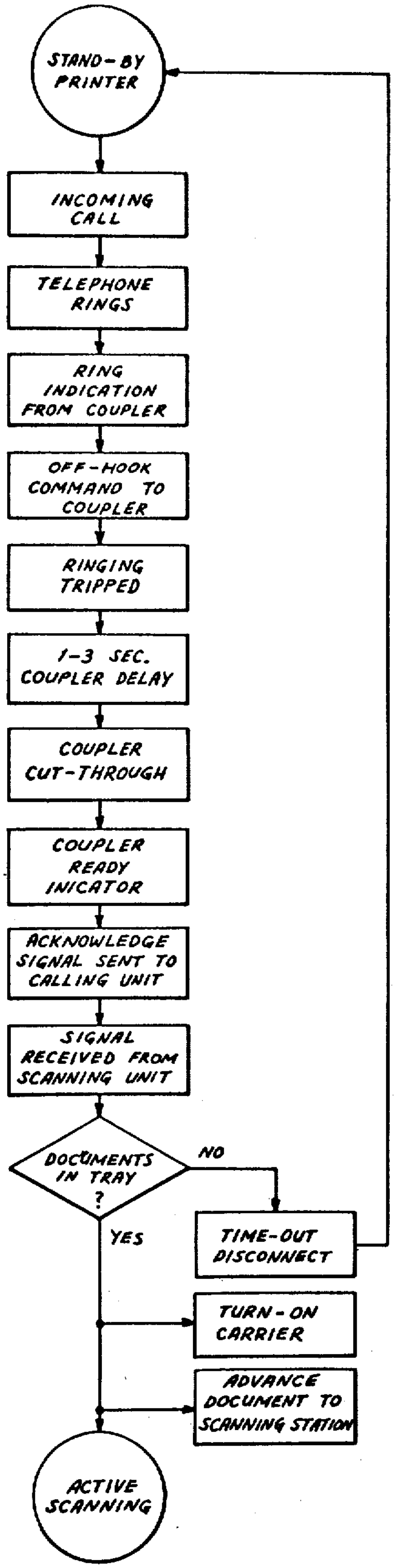
FIGS. 24 and 25 are flow diagrams illustrating the sequence of events for optional modes of operation of the apparatus of this invention.

There is illustrated in FIG. 24 a flow diagram of the operating sequence for automatic transmission from a standby printing status to an active unattended scanning status. When the polling signal is received, the machine starts up as a scanner, provided there are documents in the document tray. If documents have not been loaded, the machine will continue sending acknowledge tones until it automatically times out and disconnects.

OPTIONAL POLLING PRINTER MODE OF OPERATION

In a further optional mode of operation, a local transceiver which is, as indicated, normally in a printer standby status signals a remote unattended transceiver to transmit documents from the remote transceiver to the local transceiver. Thus, the local transceiver functions to cause the remote transceiver itself functions as a printing unit. The local unit which is termed a polling printer generates the polling signal referred to hereinbefore with respect to the optional unattended sending mode of operation. The polling printer mode of operation is initiated by the operator. The sequence control responds to this initiation and causes the generation and transmission by the receiver of the polling signal. The polling signal is detected by an unattended sending detector 122 of a remote receiver.

Figure 25:
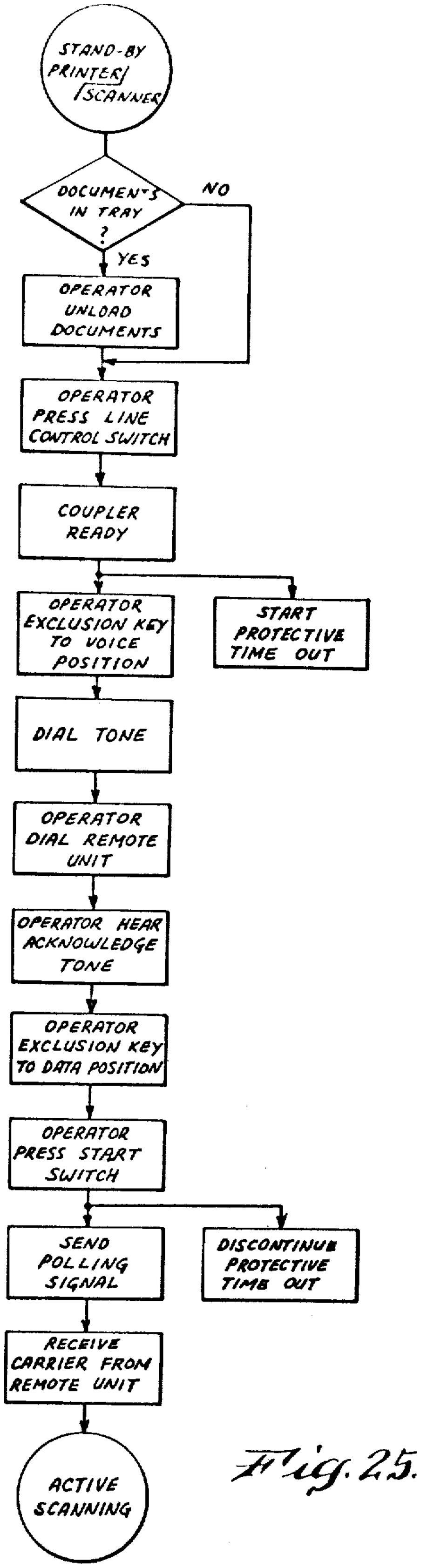

There is illustrated in FIG. 25 an operating sequence for a polling printer mode of operation. There should be no documents for scanning in the tray of the polling printer when the machine is manually started. The data coupler is cut-through by an attendant operatino a line control push button. The transmission line will then be seized if the exclusion key is in the data position. An operator will then hear the acknowledged tone bursts from the unattended remote transceiver which is adapted for operating in a principal mode. The operator then presses a start button to initiate a pulling agent and the polling printer automatically transmits the frequencies $f_3$ and $f_4$ as indicated above. The frequency $f_3$ is utilized at the unattended receiver to transfer to a scanning status. The frequency $f_2$ is utilized to initiate scanning at the unattended receiver.

COMPATIBILITY MODE OF OPERATION

The transceiving apparatus thus far described is adapted to operate with a similar transceiving apparatus in a principal mode of operation as well as in the optional modes of operation discussed. The transceiving apparatus is particularly advantageous in that it also has the flexibility to operate with dissimilar facsimile transceiving apparatus which exhibit document transmission rates, signalling formats, handshaking, and control procedures which differ from those of the present apparatus. FIG. 26 represents the signal format of a typical present day facsimile communication apparatus. In general, with present day apparatus, communication is established by ringing the remote receiver and establishing voice communication with the attendant. When readied by the attendant, the receiving unit reverse signals and acknowledges its ready to receive status by a tone burst. The sending unit will then transmit a format as illustrated in FIG. 26 preceded by the carrier signal of about 2450 cycles and followed by phasing signals. These phasing signals which occur for about 15 seconds establish synchronization between the sending and receiving units. Synchronization is presumed at the end of this period and video information then follows. At the end of the video transmission, a stop tone is generated by the sending unit indicating to the receiving unit that the transmission is completed and providing an indication for terminating operation of the remote receiving unit.

Figure 27:
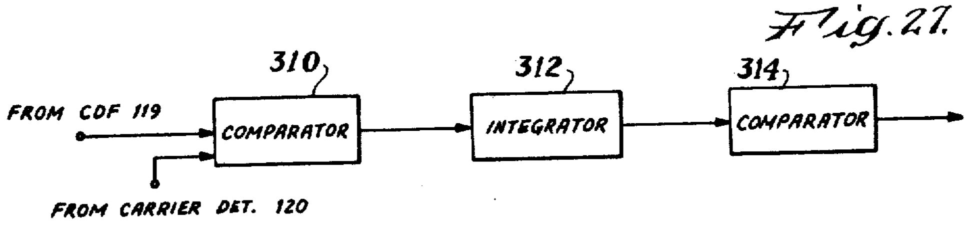

The transceiving apparatus of this invention is adapted to generate a signal format when operating in a compatible sending mode and to utilize this signal format when operating in a compatible receiving mode. A compatibility detector circuit 132 is illustrated in FIG. 27 and receives an input signal from the control detector filter 119. The compatibility detector circuit arrangement is adapted to determine whether the unit with which it is communicating comprises a similar transceiving apparatus or comprises a compatible transmitting apparatus which generates the signaling format illustrated in FIG. 26. An output signal from the compatibility detector 132 is then applied to the data set inferface 118. The compatibility detector circuit (FIG. 27) comprises a comparator 310 which distinguishes between the carrier frequency of a similar unit and the carrier frequency of the compatible unit. The output of the comparator is integrated by an integrator 312 to insure protection from extraneous noise and the output is applied to comparator 314, the output of which is stored at the time carrier detect. When the apparatus of the invention is functioning as a printer with a compatible apparatus, the printer will generate a printer ready signal after the transmission of each document. This signal can be detected by an operator in a manually controlled transmission. In the particular embodiment illustrated, a printer ready signal is not detected. When operating with certain compatible machines which do not transmit printer ready signals, the scanning operation can proceed without detecting printer ready. In another embodiment the detection of printer ready is included.

Figure 28:
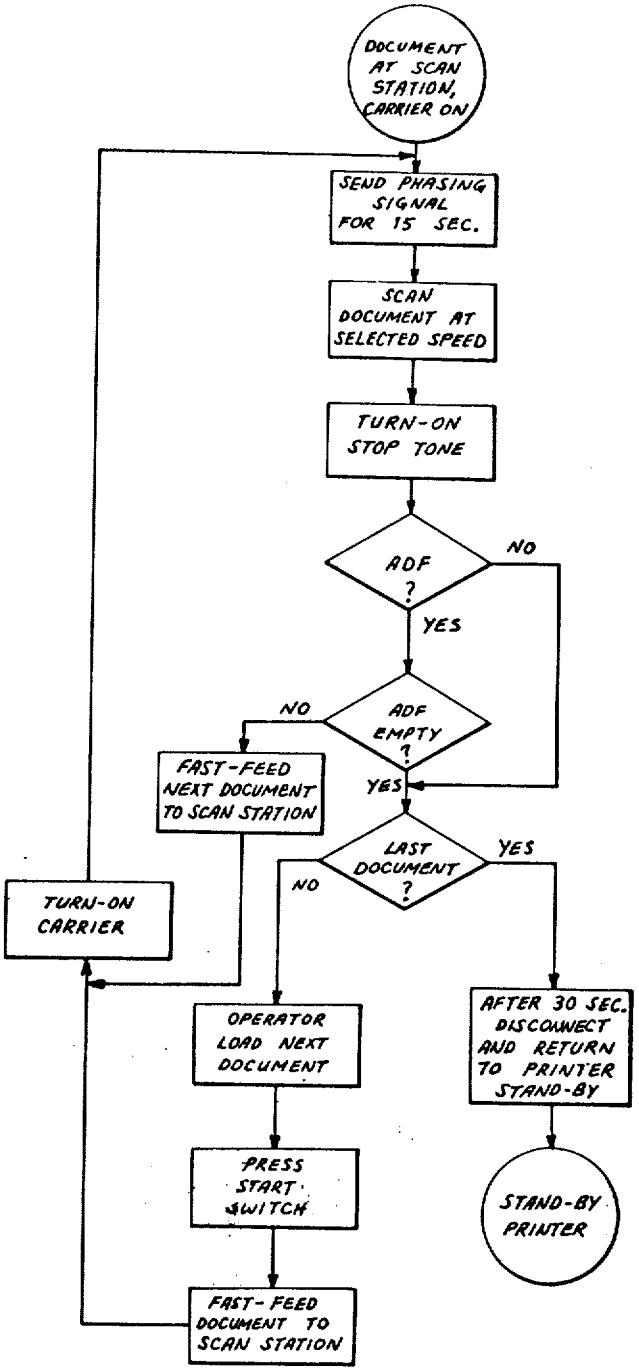
Figure 29:
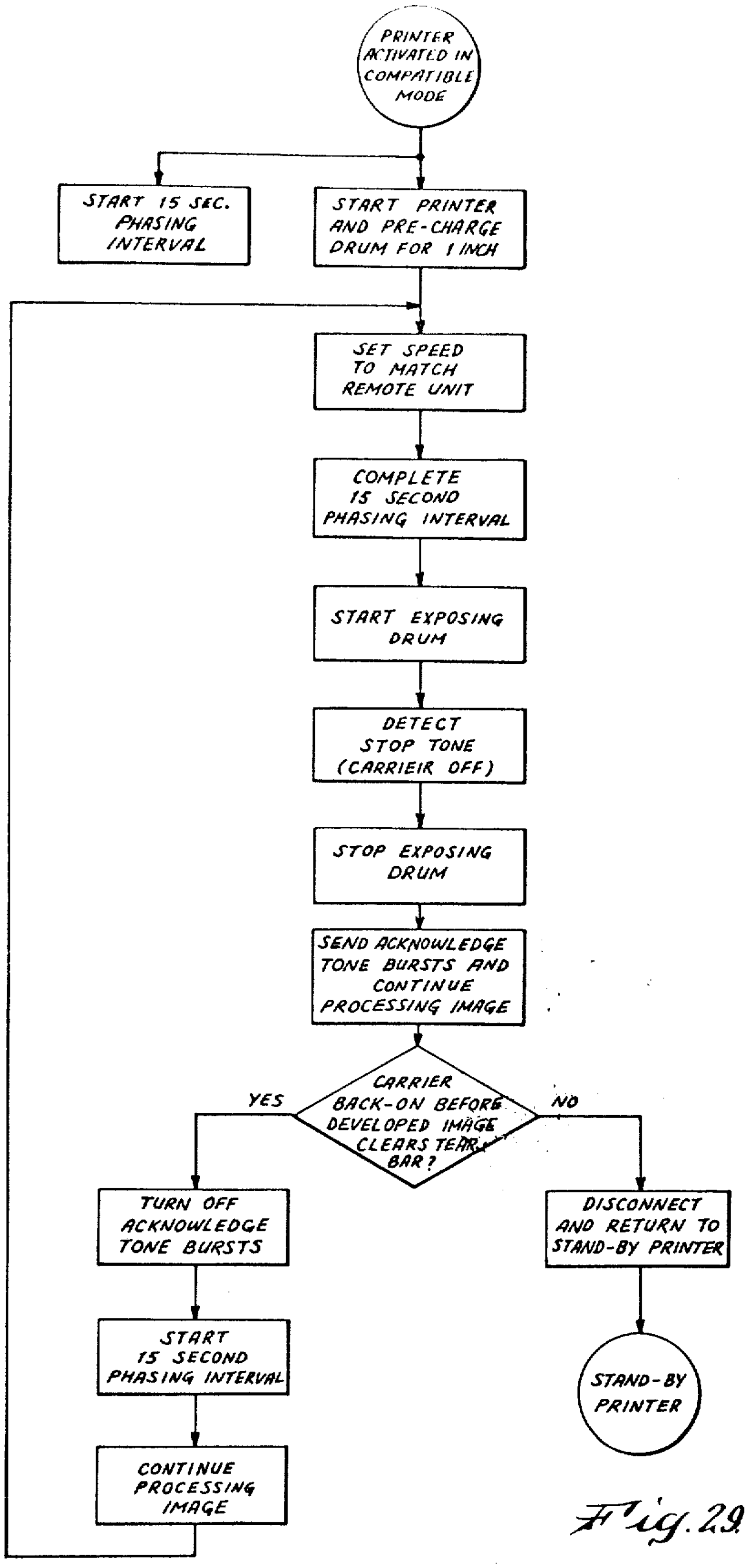

The transceiver attendant prior to initiating a transmission selects a desired transmission rate compatible with the corresponding unit. For example, when the apparatus is operating in its principal mode with a similar apparatus, the operator will select a 2 or 3 minute per document transmission rate while with a relatively slower and compatible document transmission rate apparatus, the operator will select a rate of 4 or 6 minutes per document for example. This automatically indicates to the sending unit whether it is operating in its principal mode or as a compatible transceiver. The format of FIG. 3 will then be generated in the first instance while the format of FIG. 26 will be generated in the latter case. This attendant selection is indicated to the sequence control which causes the transceiver to generate the appropriate signalling format. The flow chart of FIG. 28 illustrates the operating sequence for manual or automatic document feed scanning when the unit is communicating with a remote compatible apparatus. FIG. 29 is a flow diagram illustrating the operating sequence of events when the unit is functioning as a printer in communication with a remote compatible scanning unit.

More particular details to various components of the hereinbefore described transceiving apparatus can be found in the following copending U.S. patent applications which are assigned to the assignee of the present invention and which are incorporated herein by reference. U.S. patent application Ser. No. 227,999 filed on Feb. 22, 1972 and entitled DIGITAL TO ANALOG CONVERTER with respect to the time base generating means 228 of FIG. 5B; U.S. patent application Ser. No. 227,939 filed on Feb. 22, 1972 entitled LASER SCANNER with respect to the scanning arrangement of FIG. 12 abandoned in favor of continuing application Ser. No. 361,387, filed May 17, 1973; U.S. patent application Ser. No. 239,144 filed on Mar. 29, 1972 and entitled LASER OUTPUT POWER with respect to the laser light source 190 of FIG. 12 abandoned in favor of continuing application Ser. No. 429,246, filed Dec. 28, 1973; and U.S. patent application Ser. No. 227,938 filed on Feb. 22, 1972 entitled GALVANOMETER CORRECTION CIRCUIT with respect to the galvanometer 192 of FIG. 12 abandoned in favor of continuing application Ser. No. 402,541, filed Oct. 1, 1973.

There has thus been described an improved facsimile communication system having transceiving apparatus adapted for operating in a principal mode of operation to provide efficient utilization of bandwidth with a bandwidth limited telephone line, and which advantageously provides gray scale rendition in a reproduced image in a xerographic reproduction system. The disclosed apparatus is adapted for operating in optional modes including an automatic feeding mode, an attended sending mode, and a polling printer mode. The apparatus is further adapted for compatible operation with existing facsimile communication apparatus having a different document transmission rate, a different signalling format, and different operating sequences.

While there has been described herein particular embodiments of principal and optional modes of operation of a facsimile communication system in accordance with the invention, it will be appreciated that various modifications may be made thereto by those skilled in the art without departing from the spirit of the invention and the scope of the appended claims.

What is claimed is:

1. A facsimile communication system having a transmitting station and a receiving station, said transmitting station adapted for line scanning graphic information which is to be transmitted to said receiving station and forming a video signal for transmission, said receiving station adapted for receiving said video signal and for line scanning a record medium for forming thereon a graphic image in accordance with information contained in the video signal and conforming to the image at said transmitting station, said receiving station including means for transporting a surface upon which an image is to be reproduced in a direction which is substantially perpendicular to the direction of motion of a scanning means, said transmitted signal including a synchronizing signal component for periodically synchronizing a scanning means at the receiving station with a scanning means at the transmitting station, said transmitting station including means for modulating said synchronizing signal to have a demodulated amplitude for indicating the rate at which said surface is to be transported, said transporting means being responsive to said demodulated amplitude for transporting said surface at the indicated rate.

* * * * *